US012602700B2

(12) United States Patent
Ouyang et al.

(10) Patent No.: US 12,602,700 B2
(45) Date of Patent: Apr. 14, 2026

(54) CUSTOMER EXPERIENCE PERCEPTION BASED ON FEDERATED LEARNING

(71) Applicant: ASIAINFO TECHNOLOGIES (CHINA), INC., Haidian (CN)

(72) Inventors: Ye Ouyang, Haidian (CN); Aidong Yang, Haidian (CN); Xiangde Meng, Haidian (CN); Mohan Wu, Haidian (CN)

(73) Assignee: ASIAINFO TECHNOLOGIES (CHINA), INC., Beijing (CN)

( * ) Notice: Subject to any disclaimer, the term of this patent is extended or adjusted under 35 U.S.C. 154(b) by 0 days.

(21) Appl. No.: 18/030,949

(22) PCT Filed: May 8, 2021

(86) PCT No.: PCT/CN2021/092364
§ 371 (c)(1),
(2) Date: Apr. 7, 2023

(87) PCT Pub. No.: WO2022/236469
PCT Pub. Date: Nov. 17, 2022

(65) Prior Publication Data
US 2024/0005341 A1 Jan. 4, 2024

(51) Int. Cl.
*G06Q 30/0201* (2023.01)
*G06N 20/00* (2019.01)

(52) U.S. Cl.
CPC ......... *G06Q 30/0201* (2013.01); *G06N 20/00* (2019.01)

(58) Field of Classification Search
CPC ...... G06N 20/20; G06N 3/08; G06F 21/6245; G06Q 30/02; G06Q 20/384; G05B 19/042
See application file for complete search history.

(56) References Cited

U.S. PATENT DOCUMENTS 11,068,942 B2 * 7/2021 Briancon ............... G06N 3/088
2021/0067339 A1 3/2021 Schiatti et al.
(Continued)

FOREIGN PATENT DOCUMENTS

CN 103457773 A 12/2013
CN 106062803 A 10/2016
(Continued)

OTHER PUBLICATIONS

Translation of CN_112257873 (Year: 2021).*
(Continued)

*Primary Examiner* — Jerry O'Connor
*Assistant Examiner* — Michael R Koester
(74) *Attorney, Agent, or Firm* — Dickinson Wright PLLC

(57) ABSTRACT

The present disclosure relates to customer experience perception based on federated learning. An electronic device for a service provider in a wireless communication system, the service provider capable of implementing customer experience perception with at least one other service provider in the wireless communication system through federated learning, the electronic device comprises a processing circuit configured to: determine training data for training a global model related to the customer experience perception based on the federated learning, wherein the training data is related to the customer's experience for a specific service/product/business; perform local model training by using the determined training data to obtain intermediate information related to local model training; and transmit the intermediate information to a coordinator, so that the coordinator can train a customer experience perception model by aggregating the intermediate information from the provider and at least one other provider.

16 Claims, 15 Drawing Sheets

(56)     References Cited

U.S. PATENT DOCUMENTS

| | | | | | |
|---|---|---|---|---|---|
| 2021/0192387 A1* | 6/2021 | Benson | .................. | G06N 20/10 |
| 2022/0366220 A1* | 11/2022 | Roth | ...................... | H04L 67/34 |

FOREIGN PATENT DOCUMENTS

| | | | | | |
|---|---|---|---|---|---|
| CN | 109086446 A | | 12/2018 | | |
| CN | 110797124 A | * | 2/2020 | ......... | G06Q 10/0635 |
| CN | 111160572 A | | 5/2020 | | |
| CN | 111242304 A | | 6/2020 | | |
| CN | 111291084 A | | 6/2020 | | |
| CN | 111368984 A | | 7/2020 | | |
| CN | 111369042 A | | 7/2020 | | |
| CN | 111537945 A | | 8/2020 | | |
| CN | 111582508 A | | 8/2020 | | |
| CN | 111814985 A | | 10/2020 | | |
| CN | 112257873 A | * | 1/2021 | ............ | G06N 20/00 |
| CN | 112396189 A | * | 2/2021 | ............ | G06N 20/00 |
| CN | 112488322 A | | 3/2021 | | |
| CN | 112580821 A | | 3/2021 | | |
| CN | 109905382 A | | 6/2021 | | |
| CN | 110363305 A | | 9/2023 | | |
| CN | 111860868 A | | 10/2023 | | |
| WO | WO-2021144803 A1 | * | 7/2021 | ............... | G06F 9/54 |

OTHER PUBLICATIONS

Zhang, Hongyi, et al. "Real-time end-to-end federated learning: An automotive case study." 2021 IEEE 45th Annual Computers, Software, and Applications Conference (COMPSAC). IEEE, 2021 [online], [retrieved on Dec. 28, 2024]. Retrieved from the Internet <https://arxiv.org/pdf/2103.11879> (Year: 2021).*

Translation of CN 110797124 A (Year: 2021).*

Ma, Xiaohang, et al. "Applying federated learning in software-defined networks: A survey." Symmetry 14.2 (2022): 195 Retrieved from the Internet <https://www.mdpi.com/2073-8994/14/2/195> (Year: 2021).*

* cited by examiner

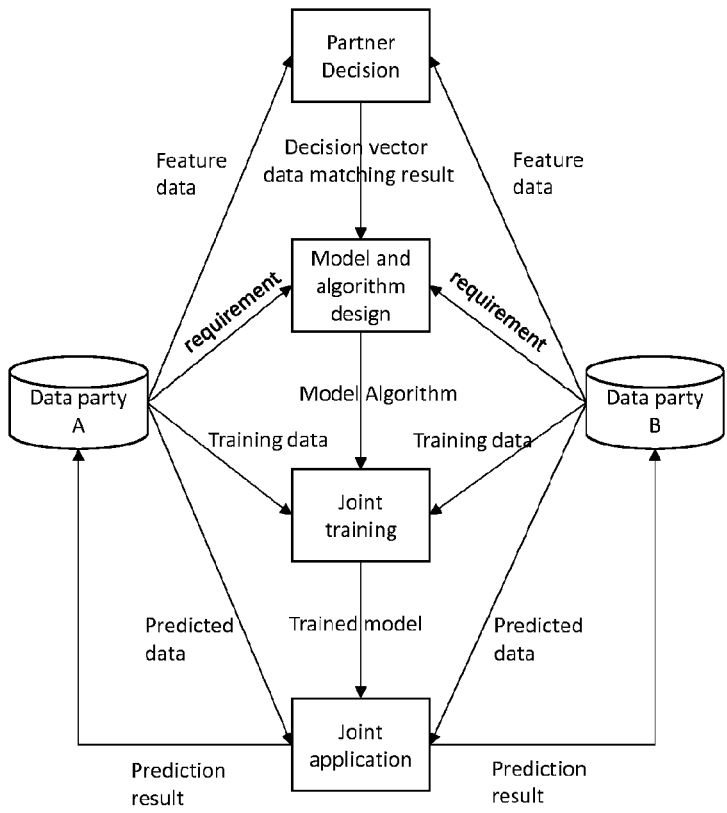

Fig. 2

| | |
|---|---|
| Objective attribute | Age, gender, user's access time, user's rating, whether group member or not whether government and enterprise customer or not, urban and rural user, whether student user or not |
| Tariff package | Whether users are in arrears, main package fee, over-package fee, call fee, traffic fee, SMS fee, average billing fee in recent 3 months, billing trend in recent 3 months, over-package average in recent 3 months, average monthly arrears in recent 3 months, package saturation, free traffic ratio |
| Electronic channel | Access frequency of each channel, user return visit interval, operation success rate, homepage browsing time, total stay time, user feedback score |
| Service perception | The number of complaints, the increase in the number of complaints, the number of complaints in recent 3 months, the trend of complaints in recent 3 months |
| Mobile call | Call failure rate (%), call drop rate (%), SRVCC handover success rate (%), SRVCC handover delay (ms), SRVCC occurrence rate (%), uplink packet loss rate (%), downlink packet loss rate (%), uplink out-of-order packet rate (%), downlink out-of-order packet rate (%), voice Mos value, call establishment delay (call connection duration) (ms), voice delay jitter (ms), voice RTP overall delay (ms) |
| LTE internet quality | Web browsing average response delay (ms), Web browsing response success rate (%), Web browsing average uplink speed (Mbps), Web browsing average downlink speed (Mbps), video jamming average times (times), video average response delay (ms), video response success rate (%), video average uplink speed (Mbps), video average downlink speed (Mbps), game landing delay (ms), game response success rate (%), game drop rate (%), game average uplink rate (Mbps), game average downlink rate (Mbps), instant messaging access success rate (%), instant messaging access delay (%), instant messaging average uplink rate (Mbps), instant messaging average downlink rate (Mbps), application download success rate (%) |
| Wideband quality | Home wideband web page opening success rate, average first screen delay , game packet loss, layer 2 network frame loss rate, layer 2 network delay, layer 2 network jitter, video stream coding rate, video stream MPEG-RTP layer packet loss rate, download rate of whole data stream (including signaling stream and video stream), and media stream packet loss rate |

CUSTOMER EXPERIENCE PERCEPTION BASED ON FEDERATED LEARNING

CROSS-REFERENCE TO RELATED APPLICATION

The present application is a National Stage Entry of International application No. PCT/CN2021/092364 filed May 8, 2021, which is hereby incorporated by reference in its entirety.

FIELD OF THE INVENTION

The present disclosure relates to a field of artificial intelligence, and particularly relates to usage of federated learning in the field of artificial intelligence.

BACKGROUND

Customer Experience Management (CEM) is a customer management technology that has emerged in recent years. It is a process of strategically managing the customer's comprehensive experience for a product/business/service or a company. Through effective grasp and management of customer experience related data, customer's satisfaction and loyalty to the product/business/service or company can be maintained and even increased, and the product/business/service or company's value can be finally enhanced.

The most commonly used method to evaluate customer's experience for the product/business/service is based on modeling of customer's experience perception, so as to realize numerical "quantification" of customer experience perception through joint (or centralized) aggregating various aspects of customer's data into a mathematical model and then utilizing the model to evaluate the customer's experience, that is, obtain a score indicating customer's experience.

However, on the one hand, in recent years, more and more attentions have been paid to protection of data privacy. According to China's relevant data privacy laws, data cannot be exchanged between companies and institutions without user's authorization, but the joint aggregation of various data means that the collection of user data must be open and transparent for all parties, which may break the data privacy. On the other hand, due to factors such as competition, security issues, approval procedures, etc., data usually belong to different parities (such as branch companies) for the product/business, and there usually are barriers for data communication between respective parities that are difficult to break down, which causes forming individual "data silos". Under the influence of such factors, the obtained customer experience perception model is often inaccurate, incomprehensive, and even is liable to be erroneous.

Therefore, secure and accurate modeling for customer's experience perception is critical and gets extensive attention.

Unless otherwise stated, it should not be assumed that any of the methods described in this section are prior art simply by being included in this section. Also, unless otherwise stated, issues recognized with respect to one or more methods should not be assumed as being recognized in any prior art on the basis of this section.

DISCLOSURE OF THE INVENTION

The present disclosure proposes a mechanism for improving customer experience perception based on the federated learning.

In particular, the present disclosure can utilize the federated learning technology to provide multi-party secure jointed customer experience perception modeling and/or evaluation, so as to conveniently, securely and accurately model customer's product/business/service experience perception for customer experience management.

An aspect of the present disclosure relates to an electronic device for a service provider in a wireless communication system, the service provider capable of implementing customer experience perception with at least one other service provider in the wireless communication system through federated learning, the electronic device can comprise a processing circuit configured to determine training data for training a global model related to the customer experience perception based on the federated learning, wherein the training data is related to the customer's experience for a specific service/product/business; perform local model training by using the determined training data to obtain intermediate information related to local model training; and transmit the intermediate information to a coordinator, so that the coordinator can train a customer experience perception model by aggregating the intermediate information from the provider and at least one other provider.

Another aspect of the present disclosure relates to an electronic device for a service coordinator in a wireless communication system, the service coordinator capable of implementing customer experience perception with at least two service providers in the wireless communication system through federated learning, the electronic device can comprise a processing circuit configured to receive intermediate information related to local model training from the at least two service providers which are obtained at the service providers by local model training by utilizing training data for training a global model related to the customer experience perception based on the federated learning, wherein the training data is related to the customer's experience for a specific service/product/business, and trains the global model by aggregating the intermediate information from the at least two service providers.

Another aspect of the present disclosure relates to a method for a service provider in a wireless communication system, the service provider capable of implementing customer experience perception with at least one other service provider in the wireless communication system through federated learning, the method can comprises determining training data for training a global model related to the customer experience perception based on the federated learning, wherein the training data is related to the customer's experience for a specific service/product/business; performing local model training by using the determined training data to obtain intermediate information related to local model training; and transmitting the intermediate information to a coordinator, so that the coordinator can train a customer experience perception model by aggregating the intermediate information from the provider and at least one other provider.

Another aspect of the present disclosure relates to a method for a service coordinator in a wireless communication system, the service coordinator capable of implementing customer experience perception with at least two service providers in the wireless communication system through federated learning, the method can comprise receiving intermediate information related to local model training from the at least two service providers which are obtained at the service providers by local model training by utilizing training data for training a global model related to the customer experience perception based on the federated learning, wherein the training data is related to the customer's experience for a specific service/product/business, and training the global model by aggregating the intermediate information from the at least two service providers.

Yet another aspect of the present disclosure relates to a non-transitory computer-readable storage medium storing executable instructions that, when executed, implement the method as previously described.

Yet another aspect of the present disclosure relates to a device which includes a processor and a storage device, and the storage device stores executable instructions that, when executed, implement the method described above.

Yet another aspect of the present disclosure relates to a computer program product containing executable instructions that, when executed, implement the method as previously described.

This section is provided to introduce some concepts in a simplified form that will be further described below in the detailed description. This section is not intended to identify key features or essential features of the claimed subject matter, nor is it intended to be used to limit the scope of the claimed subject matter. Other aspects and advantages of the technology will become apparent from the following detailed description of the embodiments and the accompanying drawings.

DESCRIPTION OF THE DRAWINGS

The above and other objects and advantages of the present disclosure will be further described below with reference to specific embodiments and with reference to the drawings. In the drawings, the same or corresponding technical features or components will be denoted by the same or corresponding reference symbols.

FIG. 2 schematically illustrates a flowchart of an exemplary one-stop secure joint modeling training and application based on federated learning according to an embodiment of the present application.

FIG. 3 illustrates exemplary user experience perception data according to an embodiment of the present disclosure.

Figure 1:
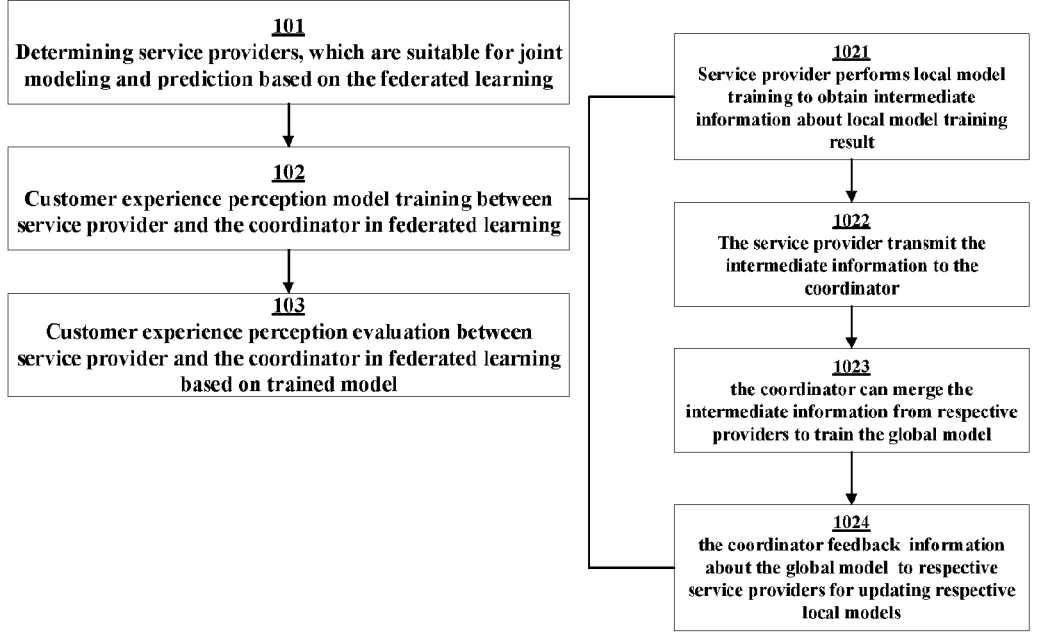
FIG. 1 schematically illustrates a flowchart of an exemplary customer experience perception service based on federated learning according to an embodiment of the present application.

The embodiments described in this section may be susceptible to various modifications and alternative forms, and specific embodiments thereof are shown by way of example in the drawings and are described in detail herein. It should be understood, however, that the drawings and detailed description thereof are not intended to limit the embodiments to the disclosed particular forms, but rather, the intention is to cover all modifications, equivalents, and alternatives falling within the spirit and scope of the claims.

DETAILED DESCRIPTION OF PREFERRED EMBODIMENTS

Hereinafter, exemplary embodiments of the present disclosure will be described with reference to the accompanying drawings. For clarity and conciseness, not all features of an embodiment are described in the specification. However, it should be understood that many implementation-specific settings must be made during the implementation of the embodiment in order to achieve specific goals of the developer, for example, to meet those restrictions related to equipment and business which may change depending on the implementation. In addition, it should also be understood that, although development work may be very complex and time-consuming, it is only a routine task for those skilled in the art benefiting from this disclosure.

Here, it should also be noted that, in order to avoid obscuring the present disclosure by unnecessary details, only processing steps and/or equipment structures that are closely related to at least the solution according to the present disclosure are shown in the drawings, while other details of little relevance to this disclosure are omitted.

As mentioned hereinbefore, the current customer experience management usually need to deal with data related to customer experience at respective parties, such as department or enterprises, and would face the following data characteristics:

(1) "Data silos, in which the data between respective parties are separate from each other and cannot be communicated thereamong;

(2) "Data compliance", in which data privacy shall be protected, so that data of a party shall be localized, instead of being shared with other parties;

(3) The data for customer experience perception usually exists in form of data fragments, and it is difficult to form a massive scale.

There are generally two modeling methods for establishing a customer experience perception model in the prior art. However, the current methods for establishing a customer experience perception model have many shortcomings and cannot obtain optimal performance.

One method is based on traditional local data modeling, wherein each party can only use its own local customer data for model training, and achieve model performance optimization through long-term iterative modeling based on local customer data. This method is only suitable for scenarios with a large amount of local data, and in such scenarios, the more the amount of local data is, the more superior the model's performance can be. However, in most cases, the amount of local data is often limited and small-scale, and the local data is often in low dimensions, which is not enough to comprehensively depict the customer's perception for the product/business. Therefore, the model generated by using this method is often not accurate and the result of perception evaluation achieved by using the model is often one-sided, and thus manual fine-tuning and optimization for the model are often required, which causes low process efficiency.

The other method is to use Transfer Learning (TL) technology, which can achieve amazing results in image processing, natural language processing, speech processing, and other similar processing. A party mastering massive amounts of data can obtain a universal pretrained model (PM) through large-scale training on the massive amounts of data, apply/transfer the pretrainedmodel to application scenarios with small-scale data, and then use the small-scale data to finely tune the pretrainedmodel so as to achieve a significant improvement in model performance for the application scenarios with small-scale data.

Nevertheless, the transfer learning has many shortcomings when applied to customer experience perception. On the one hand, it is difficult to find scenarios with massive data scale, which makes it difficult to obtain pre-trained models for customer experience by using massive amount of data related to business experience; on the other hand, the best application of transfer learning is transfer of a big data model to a small data application scenario which can obtain better performance However, customer experience data is often distributed among the parties (or branches/departments) of products/businesses and is in form of fragments, which is difficult to form a massive scale. Therefore, the transfer learning technology is difficult to be implemented in the field of customer experience perception and it has the shortcomings of poor performance even if in the field of customer experience perception.

Furthermore, due to such data characteristics and privacy and security constraints among respective parties, such as department or enterprises which own customer experience related data, it is difficult, even impossible, to aggregate all data from respective parties, and thus when it is desired to acquire customer experience perception, it may be difficult to determine suitable parties which can participate in the perception conveniently and securely, that is, it is difficult, for departments or enterprises, to find suitable partners for joint modeling conveniently and securely, and no technique in the art is proposed to deal with such difficulty.

In view of this, the present disclosure proposes a solution based on the federated learning technology which can solve the problems in the art, so as to implement improved customer experience perception. In particular, the solution of the present disclosure utilizes the federated learning technology to build a multi-party secure cooperative mechanism among respective parties to ensure that a secure joint processing for data related to customer experience for a product/business/service in the respective parties can be realized. Throughout the federated learning, respective parties/participants do not expose its own product/business related data to other participants, that is, the data at respective parties can be kept and processed locally without being shared among respective parties, while at most the data-related indicator or processing result at respective parties are communicated and aggregated to facilitate desired processing of customer experience perception. Therefore, the improved customer experience perception can be implemented while the data security and privacy can be kept well.

In an aspect, the present disclosure proposes a scheme of training a customer experience perception model based on the federated learning technology. In particular, the federated learning adopts a modeling idea of "Data not move, Model moves". Different from the traditional modeling method in which a large amount of data shall be aggregated for training the model in a centralized manner, throughout the joint modeling process based on the federated learning according to an embodiment of the present disclosure, the product/business related data of all parties are not shared, but being kept locally. And each party performs local model training by using its own data locally and then information or result of local model training are aggregated to realize global model training. Therefore, a customer experience perception model can be accurately trained in a secure joint manner while the data security and privacy can be reliably maintained.

In another aspect, the present disclosure proposes a scheme of customer experience perception evaluation/prediction based on the federated learning technology. In particular, each party can conduct its own experience perception evaluation based on its own customer experience related data and then the evaluation results of each party can be aggregated, so that an accurate, comprehensive and secure evaluation can be obtained. Throughout such evaluation based on the federated learning technology, the data of all parties are not shared thereamong, but being kept locally and thus the privacy is high. Furthermore, the federated learning technology does not require aggregation of "large-scale" data volume in the evaluation of customer experience perception, which ensures the stability of evaluation, and the comprehensiveness of the evaluation utilizing the joint model can be enhanced.

In yet another aspect, the present disclosure proposes an improved scheme for determining at least two entities/parties from a plurality of candidate parties capable of cooperating with each other to implement secure joint modeling and/or evaluation based on the federated learning technology. In particular, data contained in each of the set of candidate parties are kept locally, while only data-related indicator, including not limited to data ID and data feature identifier, of sample data in each party are utilized and their matching/overlapping status are obtained to indicate matching status among respective parties. On this basis, which ones of the set of candidate parties are suitable for secure-joint modeling and/or evaluation can be determined conveniently and securely. In such a case, the data at respective parties are kept locally without exposing to other parties, while only data-related indicators, particularly data-related indicators of some data samples, are compared, that is, the processing load in data indicator matching can be effectively reduced, therefore, it can conveniently and securely judge a set of parties suitable for secure-joint modeling and thereby establish a multi-party federal learning infrastructure, such as that described above, so that the difficulty of finding partners suitable for joint modeling can be overcome. According to an embodiment of the present disclosure, along with or based on the determination of suitable parities, the type of federated learning and even base model for the federated learning modeling and evaluation can be determined.

Note that at least the above aspects can be combined so that the present disclosure generally can construct a one-stop secure-joint modeling service based on the federated learning technology. In particular, from a plurality of parties which can serve as candidates for customer experience perception, the scheme of the present disclosure can conveniently and securely decide a set of parties suitable for joint modeling based on the federated learning, and then execute secure-joint customer experience perception modeling and/or evaluation by the set of parties based on the federated learning. Thereby, the present disclosure can provide a one-stop scheme for all services from decision-making to deployment, and the customer friendliness and service efficiency can be improved. Note that alternatively, the above aspects can be implemented separately and independently.

Note that the scheme of the present disclosure, particularly the customer experience perception based on the federated learning, can be implemented among a coordinator and at least two service providers which can communicate with each other to perform the federated learning. For example, throughout the processing to be performed in the scheme of the present disclosure, the information communicated among respective parties can be encrypted and decrypted, so that the security can be further improved. The encryption can be implemented in a variety of manners well known in the art, and would not be described in detail.

The service provider may be an entity which can contain or obtain local data, perform the processing based on the local data to obtain intermediate service-related information, such as, local modeling or evaluation result provided by the service provider, and then provide such information to a coordinator for aggregating into the final service result. In an example, the service provider may correspond to a data party which may locally contain the customer experience related data or can obtain the data, such as from an associated database or a central database, securely, and can process the data locally.

The coordinator may correspond to an entity in the system for coordinating service or processing provided by respective service providers in the federated learning, and for example, may serve as a controller/server in the system. According to an embodiment, the coordinator may obtain and then aggregate/merge intermediate service-related information from respective providers, so as to provide the desired service based on the merged service-related information. Note that the aggregation/merging can be implemented in a variety of manners known in the field of information processing, such as collection of the intermediate service-related information, further processing based on all the intermediate service-related information, etc., and will not be described in detail. According to another embodiment, the coordinator can provide feedback to the service providers or any other entity in the system. For example, the coordinator can provide feedback to the service provider for local updating. Such feedback can be performed in a variety of manners. For example, the feedback can be performed by the coordinator actively, or can be performed in a request/response manner, or can be performed in any other appropriate manner. According to yet another embodiment, the coordinator may also decide the parties suitable for customer experience perception based on the federated learning.

According to an embodiment of the present disclosure, the federated learning scheme of the present disclosure also can be implemented upon a request from a service requester, which may mean a component in the system that can request/instruct to perform a service, such as, customer experience perception, and then receive information about the service feedback from the provider and even the coordinator. For example, the requester can directly request/instruct the service providers, or can request/instruction the coordinator which in turn request the service providers to perform the federated learning.

Note that the service provider, coordinator, and requester can be established or configured in any appropriate manner. In an example, the provider, requester, and coordinator can be the same type of component, or different type of components, depending on their characteristic. For example, the provider, requester, and coordinator may all belong to a group of entities participating in the federated learning, such as data parties which contains customer experience related data, and alternatively, the requester and coordinator may also be out of the group of entities for federated learning.

In an embodiment, it can be judged that whether a data party included in the system can serve as a provider in consideration of the data information therein. In an example, an entity, which contains or obtains data information related to the desired service, such as customer experience perception, can be configured as the service provider utilized to realize the service, including the model training and/or prediction. Preferably, an entity can be further selected as the service provider in consideration its data matching status with other entities, which will be discussed hereinafter.

In an embodiment, an entity in the system can be configured as a coordinator arbitrarily or by default, such as pre-configured, such as indicated by any indication information, or hard-coded. In another embodiment, an entity in the system can be configured as a coordinator based on its capability specific for the system or specific for the kind of the federated learning, such as data processing capability, processing capacity, a resource utilization rate and the like, and for example, an entity with higher capability can serve as the coordinator. Note that the coordinator can belong to a component different from the data party, and alternatively, the coordinator can also belong to a data party, and even a data party which serves as a service provider at the same time. For example, an entity in the system, such as one of the service providers, having the best service capability serves can be set as the coordinator, so that the coordination operation would not cause a significant burden for the provider. For example, the coordinator can be voted among the providers based on certain preconfigured conditions such as computing ability, resource utilization ratio, etc., and one of the service providers having more votes becomes the coordinator.

In an embodiment, additionally or alternatively, the coordinator can be set in accordance with location information, and for example, an entity which is located much closer to the requester, particularly at the same service area, such as a cell, as the requester can be preferably established as the coordinator. Note that such location information may include physical distance in the space, and alternatively may include communication path distance, such as presented by number of relays the re among.

According to an embodiment of the present disclosure, the service providers and/or coordinator shall be set/configured by any appropriate entity, such as the service requester, any controller entity in the system, and the like. In an example, when a service to be provided, a service requester or controller can judge the characteristic or capability of related entities in the system to configure service provider and coordinator. For example, the requester or controller can configure at least two data parties as service provider and can configure the coordinator as above, and the at least two service providers can cooperate with the coordinator to realize the service based on the federated learning. In another example, a coordinator can be firstly set and then the coordinator can set/configure the service providers in a manner similar with the above. Note that the related information for configuration/determination of the provider and coordinator can pre-obtained by the controller/coordinator, or can be obtained by the controller/coordinator from the entities in a request-response manner.

In an embodiment, the establishment/configuration of provider, coordinator and/or requester can be implemented at any appropriate time during the service. For example, such establishment can be implemented in advance, and the establishment information can be statically configured, such as fixedly preset in advance, and/or can be dynamically configured, such as before each federated learning or each iteration in the federated learning, or on demand, receipt of any request, and the like.

According to the present disclosure, each of the service provider, requester and coordinator may be implemented in a variety of manners, such as hardware, firmware, software, etc. In an embodiment, each of the service provider, requester and coordinator may be any kinds of processing units/functions in the telecom communication system, even wireless communication system, which can provide intelligent service and/or perform model training for the system, such as any intelligent entity defined by O-RAN, or MDAF defined by 3GPP SA5. For example, at least the provider and/or coordinator may be at the UE side in the telecom communication system, and in this disclosure, the term "user equipment" or "UE" has the full breadth of its usual meaning and includes at least terminal equipment that is used as part of a wireless communication system or a radio system to facilitate communication. As an example, the UE may be a terminal equipment such as a mobile phone, a laptop computer, a tablet computer, a vehicle on-board communication apparatus, or the like, or an element thereof. In another embodiment, each of the service provider, requester and coordinator may be an APP at the UE side.

Note that the communication between the coordinator and providers, between the providers and requesters, as well as the providers and other entities can be performed via any appropriate signal, protocol, channel, path, form, etc., which are known in the telecom communication, as long as the status information about establishment and the data about federated learning can be securely transmitted. According to the present disclosure, considering that a telecom communication system, such as 5G system, has specific signaling or protocol mechanism used for communication, the federated learning mechanism according to the present disclosure can be implemented based on some properties, signals and indicator/parameters of the system. In an embodiment, establishment and operations of federated learning can be signaled by means of specific signals, such as broadcast signals and/or dedicated signals on a broadcast and/or specific channel from a controller and/or among service providers.

Hereinafter, embodiments of the present disclosure will be described by taking customer experience perception as an example. Note that the concept of the present disclosure can be equivalently and effectively utilized to other applications which also have the data characteristics as mentioned above, such as any other appropriate intelligent services which may relate to various data processing service; various system management service; or the like, whose data privacy shall be kept securely.

FIG. 1 schematically illustrates the customer experience perception process based on federated learning according to an embodiment of the present disclosure, wherein the customer experience perception process can be performed among appropriate parties in the system, including at least two service providers.

As shown in 101, the service providers, which are suitable for joint modeling and prediction for customer experience perception based on the federated learning, can be determined. According to an embodiment of the present disclosure, the service providers can be determined/selected from candidate entities in the system, such as data parties, in any appropriate manner. In an example, the service providers can be preset/preselected in advance, such as by default. In another example, the service providers can be determined based on data matching status (also can be equivalent to overlapping status) among entities, particularly, matching status between data-related indicators, such as data identifiers and data feature identifiers, indicating data contained in respective data parties. Note that such determination can be performed by any appropriate entity, such as a controller, coordinator, requester, etc., and the operation of determination will be described in detail hereinafter.

Then, as shown in 102, the customer experience perception model training can be performed between the service providers and a coordinator based on federated learning. In particular, at least one of the model and the federate learning manner can be appropriately set, for example, can be preset in advance, such as by default, or can be set under certain conditions, such as customer experience perception requirement, data matching/overlapping status of the service providers, etc. In an example, the federated learning can be, for example, Horizontal Federated Learning, Vertical Federated Learning, or other types of federated learning or equivalents or derivates in future.

According to an embodiment, such training can be performed iteratively, until a particular condition, requirement or criteria is satisfied. For example, in an iterative model training process, after each round of iteration or at the end of each round of iteration, it will be verified whether the trained model meets the related requirement or criteria. If not, the model training processing will continue to the next round, until the model meets the related requirement or criteria, and then the model training will end, and the final model is obtained. For example, the requirement or criteria may involve any of whether the output of the model, such as data analysis accuracy, etc., is higher than a threshold, whether the model loss is smaller than a corresponding threshold, whether the number of iterations reaches a predetermined number, and the like. The iterative concept of model training can be implemented in a variety of manners in the art, and will not be described in detail herein.

According to an embodiment of the present disclosure, in each iteration, the model training can be performed as follows.

In 1021, each of the service providers can perform local model training based on local training data, such as customer experience related data, and thus obtain the local model training result as an intermediate information related to the global model, which may include, for example, the model contents or model parameters for constituting or optimizing the global model. According to an embodiment, the service provider can perform the model training by using a model which may be a part of a global model to be trained or may construct the global model, be referred as a local model, or the global model per se.

Then, in 1022, the service provider can transmit the intermediate information to the coordinator. Such transmission can be performed in a variety of manners, such as periodically, upon request from a requester or other entity, etc. For example, the provider can transmit the information immediately after the local modeling is performed or after a predetermined time duration since the local modeling is performed. In an example, the communication between the service provider and the coordinator is performed in an encryption manner so that the security of data can be further improved.

In 1023, after receiving the information from the respective providers, the coordinator can merge the intermediate information from respective providers to train the global model for customer experience perception. Such merge can be performed in a variety of manners useful for constituting the global model, for example, combination of the respective model contents/model parameters to build the global model, further processing based on all the models/model parameters to build the global model, any other manners for building the global model based on sub-models/model parameters, and will not described in detail.

In 1024, when the global model does not meet a predetermined requirement as mentioned above, the coordinator can transmit any information about the global model back to respective service providers for updating respective local models, if any. Therefore, the above operations from 1021 to 1024 can be iteratively performed until the global model meets a predetermined requirement, so that a customer experience perception model can be trained based on the federated learning accurately while the data can be kept in respective service provider securely.

Note that the service related to customer experience perception modeling can be triggered/activated by the coordinator and even by a requester. For example, the requester can request/instruct the providers and coordinator to perform customer experience perception model training based on federated learning, and the requester can receive the modeling result from the provider and/or coordinator.

As shown in 103, the customer experience perception evaluation can be performed based on the trained model as requested by a requester, which can be, for example, the coordinator, one of the data parties, or other appropriate entity in the system. In particular, the requester can present a desired indicator related to the customer experience perception evaluation, such as user identifier, data feature identifier, etc., to the coordinator to request implementation of evaluation and the coordinator then communicates the indicator to the data parties, or the requester can present a desired indicator directly to the data parties. Upon receipt of the indicator, the data parties can perform local evaluation by means of the local data corresponding to the indicator and the trained model, and then transmit the local evaluation result as an intermediate evaluation information to the coordinator. Note that the local data may mean customer experience related data corresponding to the indicator. The coordinator can combine the local evaluation results from respective data parties to obtain the final evaluation result, for example, merge the information from respective providers to create the total evaluation result of customer experience perception, and then transmits the final evaluation result to the requester. Note that the communication between the provider and coordinator and/or requester, the merging operation at the coordinator, and other similar operation can be implemented in a way similar with that during modeling as described above, and will not described again.

Note that although FIG. 1 illustrates such three phases including service provider determination, model training and perception evaluation, not all the three phases is necessary to be performed in a process concurrently. According to an embodiment, the service provider determination, model training and perception evaluation can be executed separately, and each can be invoked at appropriate time. For example, from a plurality of parties in the system as candidates, the service providers suitable for customer experience perception can be determined and then pre-stored in advance. When the perception is to be implemented, the service providers can be triggered/called to perform modeling and evaluation. In another example, the model can be trained and pre-stored, such as periodically, and when the perception is to be implemented for an object, such as a customer ID, the corresponding model can be invoked and be utilized for evaluation based on federated learning.

According to another embodiment, all the three phases can be sequentially executed for an evaluation application. For example, when the evaluation of customer experience perception for a product/service is to be performed, service provider determination for the product/service can be firstly performed, then a model can be trained based on the matched ID, and finally the evaluation is obtained based on the trained model. And in such a case, a so-called one-stop secure joint service can be provided, and the user's friendliness and convenience can be improved.

FIG. 2 illustrates a schematic flow of an exemplary customer experience perception process based on the federated learning according to an embodiment of the present disclosure, wherein the customer experience perception process can be an exemplary implementation of the concept as shown in FIG. 1. For the sake of clarity, only two data parties A and B, which are examples of service providers that can obtain and process the data for perception modeling and evaluation, are shown FIG. 2, but two data parties are only exemplary and the number of data parties is not so limited. Note that although not shown, other parties, such as the coordinator and requester, still can exist and operates as described above.

In FIG. 2, in a decision-making stage, the data parities A, B can provide feature data to a decision module to find potential product/business partners and reaching cooperation intention, so that a multi-party federated learning cooperation mechanism can be established based on the decision of the decision module. In particular, for each of the parties A, B, the potential product/business partners may mean other candidate parties in the system which can cooperate with the party to implement experience perception based on the federated learning, even the other of the parties A, B. For example, the decision module can decide whether parties A, B can cooperate with each other. According to an embodiment, the decision-making can be performed based on data matching between the data parties, which will be descried hereinafter, and can output a decision vector which may indicate data parties suitable for the federated learning. Additionally, or alternatively, the decision-making module may further output data matching result.

Then, in a model design stage, federated learning classification and model establishment can be performed based on the decision vector and data matching result from the decision module as well as requirement of respective data parties, so that an appropriate federated learning algorithm can be determined, and optionally, an appropriate model structure can be further determined as the training object.

With respect to the determined federated learning algorithm and model structure, the data parties can utilize their training data to train such model in a secure joint modeling process, as indicated in the joint training stage. In particular, the training process may include data alignment (such as ID matching) and model joint training between product/business data parties, and the data communication during training can be performed in an encryption manner.

Then, in the application phase, by means of the trained joint model, joint prediction/evaluation can be performed, in which the prediction application can be performed based on the model and the prediction data from respective data parties in a federated learning manner, that is, similar with training, the prediction also can be performed at respective data parties locally and then the local prediction result can be aggregated. Although the prediction result is output to respective data parties as shown, it is only exemplary, and the prediction result can be forwarded to a prediction requester, be output to the coordinator to be forwarded to the requester, or directly output to the requester.

The whole of stages as illustrated in FIG. 2 can be performed separately, or can be performed sequentially so that a one-stop secure-joint modeling and application can be achieved.

Hereinafter, some embodiments of the present disclosure related to cooperative partner determination will be described in detail. In particular, before conducting federated learning, it is necessary to decide at least two service providers which can serve as cooperative partners suitable for joint model training and/or application based on the federated learning.

According to an embodiment, such cooperative partners can be selected from a plurality of candidate service providers based on information about data overlapping/matching thereamong, that is, the data commonality thereamong. For example, the candidate service provider may be any data party in the system, and the plurality of candidate service providers may be any number of data parties in the system. In an example, the information may indicate data overlapping/matching condition, for example, the ratio, such as percentage, of the overlapped/matched data in the total of data. According to an embodiment, such judgement/selection/determination can be performed by a controller, a coordinator, even a requester, or any appropriate entity in the system.

According to an embodiment, the data overlapping can be performed by using only data-related indicators of some samples in the data from respective data parties. Therefore, only the data-related indicator, instead the data per se, are utilized, the security can be high, and only data samples are utilized, instead of all data, and the data overlapping status can be reasonably derived from overlapping between data-related indicators of the data sample, the processing load is low while the determination accuracy can be maintained.

According to an embodiment, generally, data can be expressed in matrix form, with each row representing a data ID and each column representing a data feature. For example, the data ID may mean ID indicating a party to which the data related to customer experience pertains, such as, user ID, phone ID, device ID, business/product ID, etc., and the data feature may mean data item type, data component, etc., and the data feature can be indicated by its ID or corresponding name. According to an embodiment, the data overlapping may include at least one of data party overlapping and data feature overlapping, and correspondingly, the data-related indicator may include at least one of data party ID and data feature ID. According to an embodiment of the present disclosure, for two service providers, when the data ID overlapping condition or data feature ID overlapping condition is high, such as higher than a predetermined threshold, such two service providers can cooperate. FIG. 3 illustrates exemplary customer experience perception related data according to an embodiment of the present disclosure. For example, the data can have a variety of components, such as objective attribute, package service tariffs, electronic channels, service perception, mobile call, Internet quality, and the like. Such data may correspond to a user ID, product ID, etc.

According to an embodiment of the present application, such judgement/selection/determination can be performed for every two of a plurality of service providers, that is, it can be judged whether such two service providers are suitable for cooperating with each other to perform joint model training based on the data overlapping condition thereamong. In particular, according to an embodiment of the present disclosure, when the data overlapping condition is high, such as higher than a predetermined threshold, it is judged that such two providers can cooperate with each other. And then based on all judgement results, a set of data parties suitable for cooperative joint modeling can be determined/selected from the plurality of service providers. For example, the set of data parties are a set of data parties in which every two data parties can cooperate with each other.

Figure 4A:
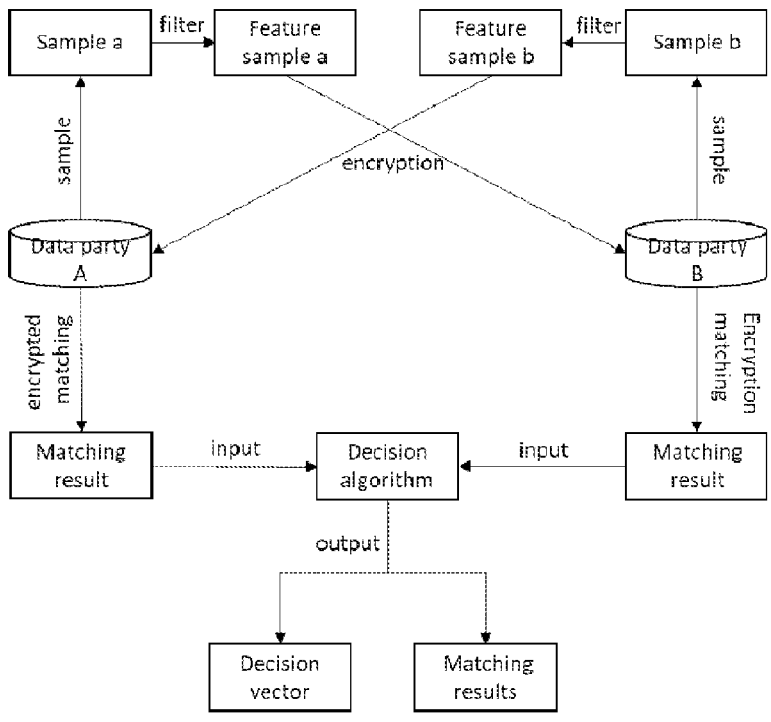
FIG. 4A illustrates an exemplary process of cooperative decision between two data parties according to an embodiment of the present disclosure.

FIG. 4A illustrates a flowchart of cooperative partner decision according to the present application, wherein it is judged whether two data parties A, B, as examples of the service provider of the present application, can cooperate with each other. And the process further operates in an encryption manner to improve security, and note that such encryption manner is not necessary. In particular, such decision can be implemented in the decision stage as mentioned above.

Firstly, two sample sets a and b are sampled from data parties A and B respectively, and the sampling process can be performed in a variety of manners, such as random sampling. The data in such sample sets can be filtered, and only the data ID and feature names, which are standardized by both parties A and B, are remained for decision. Such filtering process can be performed by any appropriate entity, such as a coordinator receiving and filtering the data samples, and is preferably performed by the data party per se. Note that a standardized data feature naming rule can be utilized to standardize the data feature names, and such rule can be negotiated between the two parties, or can be notified by a coordinator. The rule can be implemented by a variety of manners, and not described in detail herein.

Then, the data ID and data feature names of samples a and b are encrypted and transmitted back to data parties B and A respectively. Note that the encryption algorithm can be any appropriate algorithm, such as double encryption and a common hash value algorithm, and can be set by the coordinator or negotiated between the two parties in advance.

Upon receipt of the data, each of data parties A and B can encrypt the data ID in its own database with the same encryption algorithm and compare it with the sample data, the data party can obtain the ratio of the number of common user IDs to the total number of samples, as an example of data ID matching/overlapping ratio. In the same way, the data party can compare the sample feature names with the feature names of its own data, and obtains the ratio of the number of common features to the total number of features of the sample data, as an example of data feature matching/overlapping ratio.

Then, each party can present the data ID matching ratio and/or data feature matching ratio as the matching result to a decider so that it can be judged whether such two data parties are suitable for cooperative modeling. In particular, such matching ratio of ID and/or feature can be evaluated in combination with the data scale of the parties, so as to judge whether the parties are suitable for participating in federal learning. Such decider can be any appropriate entity, such as a coordinator, or even any of parties A, B.

According to an embodiment, the decider entity can output a decision vector, which indicates whether the data parties are suitable for cooperating with each other in modeling. For example, for each of the two parties, the decision vector can comprise a component indicating whether such party is willing to cooperate with the other party. Furthermore, the decider entity can output information which can be utilized for setting of federated learning model and classification, such as data ID matching ratio matrix, data ID matching quantity matrix, data feature matching matrix and so on.

In the whole process, the data ID and features in the sample are encrypted and then transmitted, without decryption, so there is no risk of privacy leakage. At the same time, the samples come from the sampling process, so the required sample amount is far less than the total data, the transmission demand and processing load are small, while the universality and credibility of data can be guaranteed. In particular, the small sample amount can reduce the computation load in data matching, and the entity can quickly judge whether the parties can perform joint modeling.

Hereinafter an example of cooperative decision-making process will be described, wherein Company A and Company B, as two data parties, are interested in finding joint modeling partners, but do not want to share internal data with each other.

In operation, companies A and B each randomly selects 1000 data from their database ready to participate in the training, and filters out all data information except the user name and data feature name.

Then, the companies A and B each modifies the data feature names according to a standard data feature naming rule, and then encrypt the data ID and data features of samples according to an encryption algorithm, such as hash value encryption algorithm. After processing, each of the companies A and B will transfer the corresponding sample data information to the other side.

Upon receiving the information, the companies A and B each encrypts the user ID in their own database with the same hash value encryption algorithm and match it with the encrypted value from the other party. The matching result is that there are 400 samples of company B that can match the data samples of company A, the ratio is 40%, and the 95% confidence interval is about 37%-43%; There are 750 samples from Company A that can match the data samples from Company B, with a ratio of 75% and a 95% confidence interval of 72.3%-77.7%.

In a similar way, companies A and B each compare the encrypted data feature names from the other party with the encrypted data feature names in its own database, and the comparison result is that Company A owns 5% of the data features in company B's sample, and company B owns 10% of the data features in company A's sample.

Further considering actual data amount in each company, for example, company A has 10 million users and company B has 20 million users, and thus for Company A, Company B has 7.4-8.6 million common users, with 95% of available data characteristics, and is a good cooperative partner. For Company B, Company A has 7,230,000-7,770,000 common users, with 90% of available data features, so cooperation is beneficial. Therefore, it can be judged that both parties may be interested in cooperating with each other for jointing modeling.

According to an embodiment of the present disclosure, a multi-party federal learning cooperation mechanism can be constructed so as to quickly and securely coordinate multiple potential data parties to participate in federal learning. In particular, such construction can be performed based on the cooperative decision-making process as above. For example, when there exists more parties to be judged for cooperation, for every two parties, the above cooperative decision-making process can be performed and a corresponding decision result can be obtained, so that a final decision vector/matrix can be obtained. Therefore, for each party, the final decision vector/matrix can contain components indicating whether such party is interested in cooperating with each of the other parties respectively, and from the plurality of data parties, a set of data parties which are suitable for joint modeling thereamong can be determined with reference to the final decision vector/matrix.

Figure 4B:
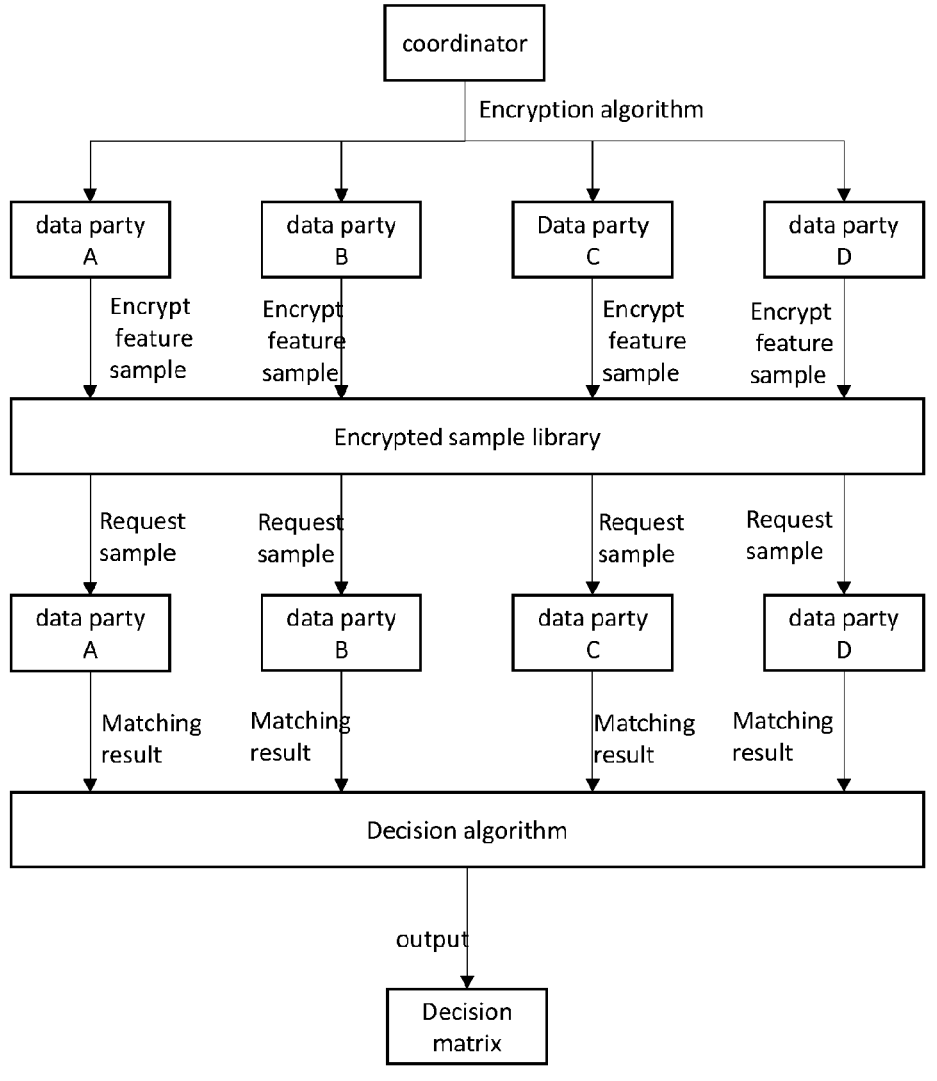
FIG. 4B illustrates an exemplary process of cooperative decision among a plurality of data parties according to an embodiment of the present disclosure.

FIG. 4B illustrates a schematic diagram indicating the cooperative party decision for a plurality of data parties according to the present disclosure, wherein particularly, such decision process can be performed by an appropriate entity, such as a coordinator, a controller, and so on in the system.

Each of four data parties A, B C, D can perform the follow operation. Firstly, the data party randomly samples a certain number of data samples from a database that it is willing to provide to participate in federal learning, and encrypts the sample data ID and data feature name after filtering, as described above. Then, the data party sends sample data requests to all potential partners, such as all of other data parties, and receives encrypted samples of each of the partners.

For example, the data party can receive the encrypted samples directly from each of the partners which transmit the encrypted samples upon request. As another example, each data party can transmit its encrypted samples to a database and thus can retrieve the encrypted samples of other parties from the database. For example, the database can be located at any appropriate entity, such as a coordinator.

Upon receipt of encrypted samples of other parties, the data party encrypt all of its own samples, and then match them to the received encrypted samples, so as to obtain the matching degree between data ID and data features between the party and each of the other parties, and import the matching result into a decision algorithm for deciding a combination of parties suitable for joint modeling.

The decision algorithm can create a decision matrix according to the multi-party data scale and sample data matching results, which indicates whether the data parties are suitable for joint modeling, and thus a combination of joint modeling data parties can be recommended based on the decision matrix. Note that the decision algorithm can be located at any appropriate entity in the system, such as a coordinator, so that the coordinator can collect all matching results from each party, and then recommend the joint modeling combination. Table 1 shows an exemplary decision matrix.

TABLE 1

| Potential partner | A | B | C | D |
|---|---|---|---|---|
| A | — | T | T | T |
| B | T | — | F | T |

TABLE 1-continued

| Potential partner | A | B | C | D |
|---|---|---|---|---|
| C | | T | F | — | F |
| D | | T | T | T | — |

Where "T" indicates cooperation is recommended, "F" indicates cooperation is not recommended, therefore, a recommended cooperation of data parties is {A, B, D}.

Then, a combination of data parties can be constructed to participate in subsequent joint modeling. In an example, such combination shall be confirmed by respective parties included in the combination before its application. More specifically, the coordinator can transmit the information about the cooperation to each party, and when the positive acknowledge is received from each party, that is, each party presents agreement to cooperate, the coordinator can determine the combination result for subsequent joint modeling.

In this mechanism, the coordinator only provides encryption methods and decision algorithms, does not touch the sample data, and does not violate the privacy rights of the data party. The sample data of the data party is encrypted, without being decrypted by means of private key, and the number of the sample data is small, which is difficult to be cracked by other data parties to result in leakage. Moreover, the random sampling with small order of magnitude can facilitate in quickly and conveniently screening a large number of potential partners at one time, while ensuring the universality of samples, without consuming huge computational power. The decision matrix formed by the combination of decision vectors of multiple data parties also provides a basis for the algorithm recommend and multi-party cooperation combination, and lowers the cooperation threshold.

According to an embodiment, the service providers can perform joint model training by using a federated learning algorithm, the federated learning algorithm to be utilized for joint modeling can be preset in advance, or can be determined based on data overlapping conditions between the service providers, such as that mentioned above. Such determination of federated learning algorithm can be performed by any appropriate entity, such as a coordinator.

According to an embodiment, the federated learning algorithm can be a vertical federated learning algorithm under a condition that the data ID matching ratio is larger, but the data feature matching ratio is smaller. Such condition can be in a variety of forms. For example, such condition may mean the data ID matching ratio is larger than the data feature matching ratio, or such condition may mean the data ID matching ratio is larger than a threshold, and/or the data feature matching portion is smaller than a threshold. According to an embodiment, the federated learning algorithm can be a horizontal federated learning algorithm under a condition that the data ID matching ratio is smaller, but the data feature matching portion is larger. And in such a case, the condition may be in a similar form with that described above.

According to an embodiment of the present disclosure, the model to be joint trained by the service provider can be preset, or can be determined by any appropriate entity, such as a coordinator. According to an embodiment, the model to be joint trained by the service providers can be determined based on at least one of data matching result among the service providers and requirement of the service providers. For example, the data matching result among the service providers can be at least one of the data ID matching ratio and data feature matching ratio as mentioned above, and the requirement of the service provider can be any of processing performance requirement, load requirement, privacy requirement, secure requirement, etc.

Figure 5A:
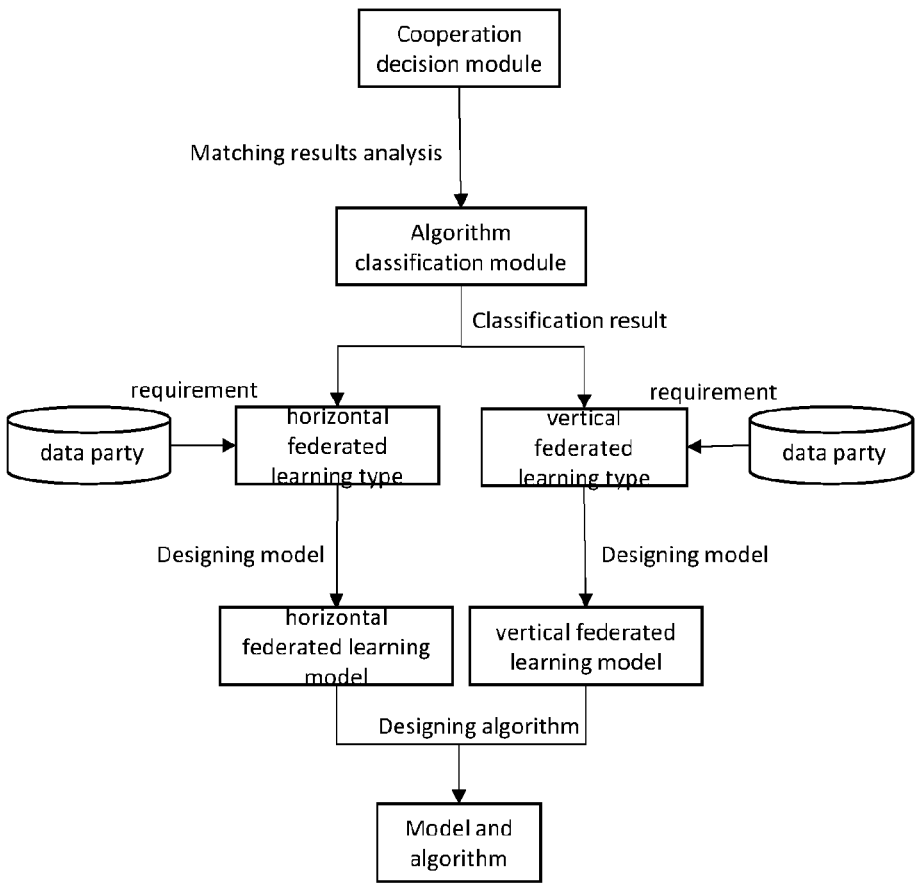
FIG. 5A illustrates an exemplary process of designing a federated learning type and model to be trained according to an embodiment of the present disclosure.

FIG. 5A illustrates a flowchart of determination of the federated learning algorithm according to an embodiment of the present disclosure, wherein the federated learning algorithm for the data parties A and B will be determined. In particular, when the data parties decide to carry out joint modeling, the coordinator or the data parties should decide which kind of federated learning algorithm to be used and serve as the basis of modeling, based on requirements and information about matching results between the data parties.

The information about data overlapping ratio between data parties A and B can be input into an algorithm classification module for determining a federate learning type which is consistent with the data overlapping characteristics. Note that the information can be pre-determined in advance, or can be determined in the previous cooperative decision process and then be input. For example, the module can be included in/implemented by any appropriate entity in the system, such as a coordinator, a data party, even the data party A or B.

Figure 5B:
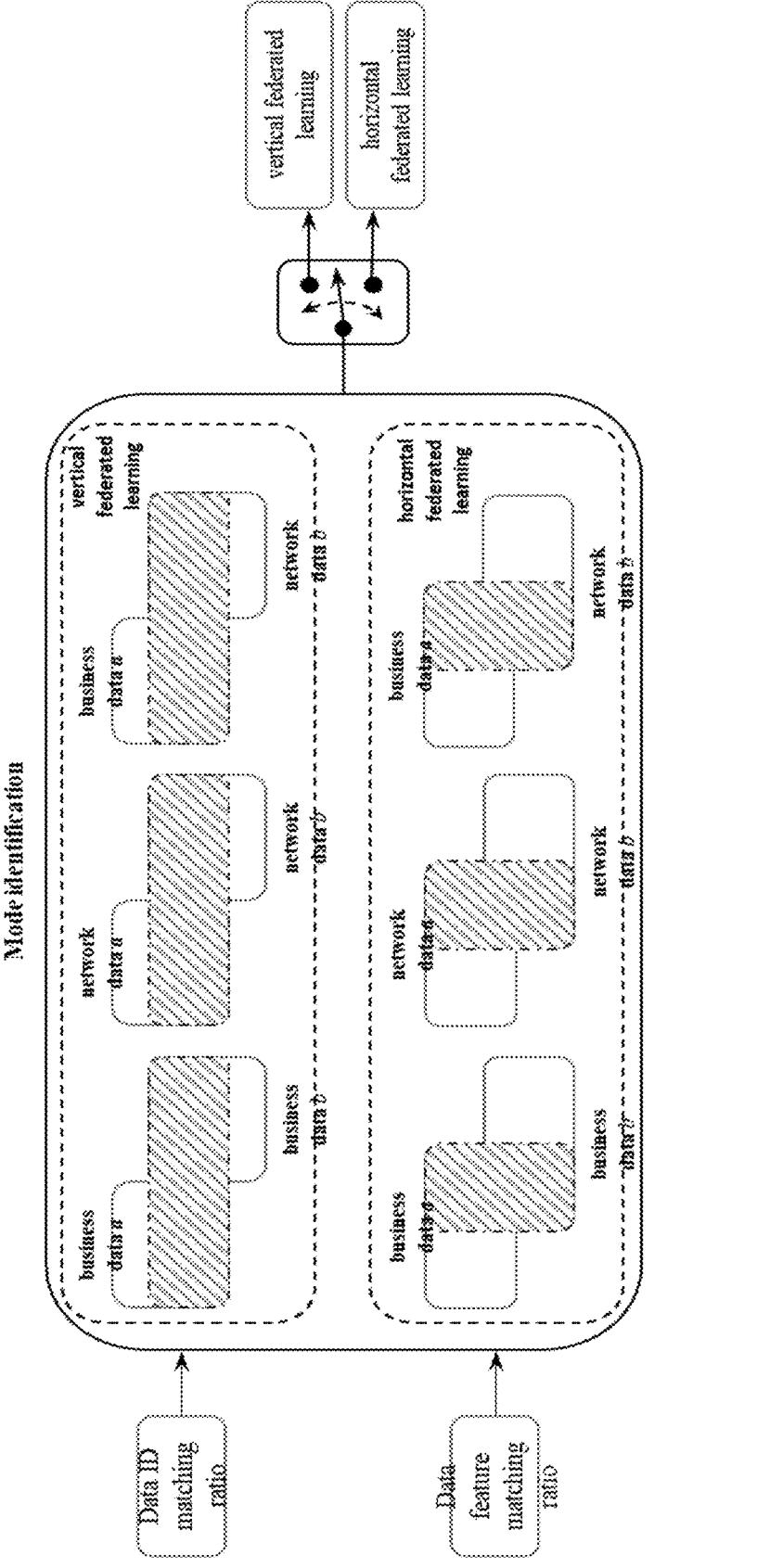
FIG. 5B illustrates an exemplary federated learning type identification according to an embodiment of the present disclosure.

As shown in FIG. 5B, when the data feature space overlaps more and the data ID space overlaps less, the data is suitable for the horizontal federated learning; while when the data ID space overlaps more and the data feature space overlaps less, the data is suitable for vertical federated learning.

After the classification, a model structure can be designed in consideration with the requirement of the data parties. In particular, according to the requirement of each data party, an appropriate basic model can be selected from possible model constructions corresponding to the classification result. And in turn, according to the data characteristics of each data party, the optimal model structure is designed. Note that any appropriate method/process for model design and algorithm design can be included, and will not be described in detail here.

With respect to the designed model structure, a federated learning algorithm can be designed, such as under the data privacy restrictions of each data party, so that it can ensure the privacy of the user data will not be broken during model training.

After the model and algorithm design are completed, the coordinator can transmit information about the model and algorithm to the corresponding data parties so as to cause them to be ready for subsequent data training. In an example, the transmitted model can be a part of the whole of the model corresponding to each data party, that is, a data party only receives a party of the model corresponding thereto. In another example, the transmitted model can be the whole of the model, that is, each data party receives the whole model.

This design process reduces the separation between business data (B domain) and network data (O domain) in traditional customer-aware data analysis. For example, the combination of relevant business data and relevant network data with any data characteristics can be modeled jointly by selecting an appropriate algorithm through the algorithm classification module, as mentioned above.

Hereinafter model training and application according to embodiments of the present application will be described in detail. In particular, the model training and application can be performed among the coordinator and at least two service providers in a secure-joint manner.

Figure 6:
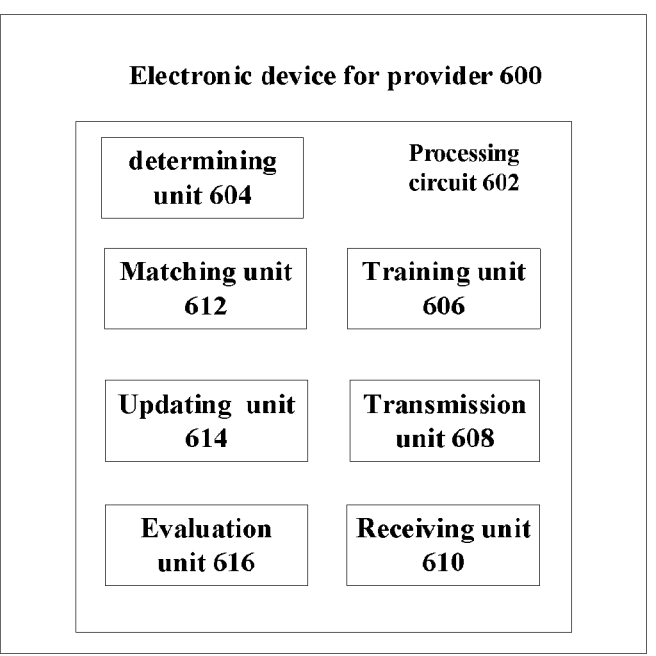
FIG. 6 illustrates a schematic block view of an electronic device for a provider according to an embodiment of the present disclosure.

FIG. 6 illustrates a schematic block view of an electronic device for a service provider in a wireless communication system according to an embodiment of the present disclosure. The service provider is capable of implementing joint modeling for customer experience perception with a coordinator and at least one other provider in the wireless communication system through federated learning, wherein the service provider and the at least one other provider can be referred to as cooperative partner. The electronic device 300 comprises a processing circuit 302 which can be configured to determine training data for model training based on the federated learning, wherein the training data is related to the customer's experience for a specific service/product/business; perform local model training by using the determined training data based on a specific federated learning algorithm to obtain intermediate information related to local model training; and transmit the intermediate information to the coordinator, so that the coordinator can train a customer experience perception model by aggregating the intermediate information from the provider and at least one other provider.

According to an embodiment of the present disclosure, the training data can be determined in consideration of the type of federated learning or federated learning algorithm to be utilized for model training. In particular, the federated learning to be utilized may be Horizontal federated learning or Vertical federated learning, or any other appropriate type of federated learning, and thus the training data can be determined correspondingly.

According to an embodiment of the present disclosure, the type of federated learning or the federated learning algorithm can be acquired by the service provider in a variety of manners, for example, can be preconfigured and set in the service provider, or can be notified to the service provider via information about federated learning algorithm, such as algorithm name, ID, etc. In an example, the type of federated learning or the federated learning algorithm can be determined in a manner as mentioned above and then notified to the provider.

According to an embodiment, a data party may contain its own local data which is available for customer experience perception and which is interested in participating in model training, and the training data may be derived from such local data. For example, the federated learning algorithm can be a horizontal federated learning algorithm, and in such a case, respective data parties can directly utilize its own local data available for customer experience which is interested in participating in model training as the training data to perform the model training. According to another embodiment, the federated learning algorithm can be a vertical federated learning algorithm, and in such a case, before the model training, the data parties participating in the joint modeling shall find common data ID, and then each party can obtain data corresponding to the common data ID in its own local available data as the training data, and utilize such data for model training.

According to an embodiment, the model to be joint trained by the service provider also can acquired by the service provider in a variety of manners, for example, the information about model, such as algorithm name, ID, etc., can be transmitted to the service provider, or can be preconfigured in the service provider.

Hereinafter the data ID matching according to the present disclosure will be described. In particular, the ID matching aims to find common data IDs among the service providers, and ID matching can be performed between the data parties, or data parties and the coordinator, and/or can be performed upon a request from the requester.

Figure 7:
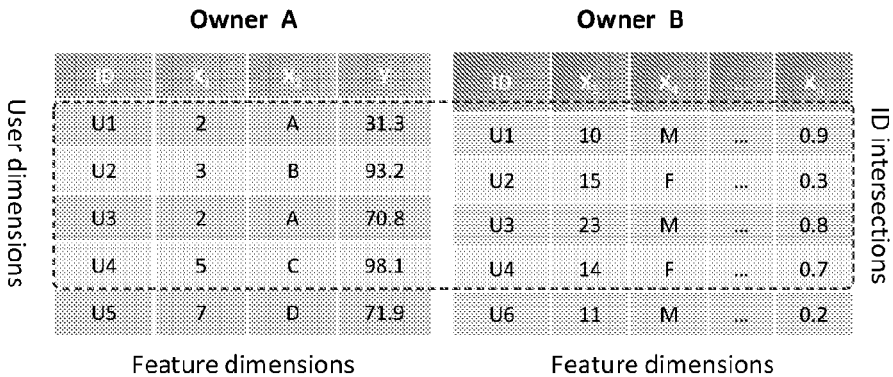
FIG. 7 illustrates exemplary sample data tables from two parties for ID matching.

FIG. 7 illustrates exemplary data format and ID intersection according to an embodiment of the present disclosure. As shown in FIG. 7, the data from the data party A is in two dimensions, including user ID dimension and feature dimension, the user ID dimension indicates the user IDs of the data, the feature dimension indicates feature components of the data.

And the ID intersection between the data from party A and party B can be obtained as common IDs. For example, data party A and B share the data of users $u_1$, $u_2$, $u_3$, but data party A does not want data party B to know that it has the data of user $u_4$, and data party B does not want data party A to know that it has the data of user $u_5$. To satisfy the requirement of protecting privacies of data parties A and B, it is necessary to find an intersection of users $\{u_1, u_2, u_3\}$, that is, the users commonly contained in the data party.

The ID intersection can be obtained by ID matching. Note that, such ID matching only aims to obtain ID intersection, i.e. ID commonly in data parties A and B, without exposing specific data types and contents contained in data parties A and B. Therefore, such ID matching would not break the privacy of data, and the data dimensions for the common ID can be expanded for facilitating model training.

Figure 8A:
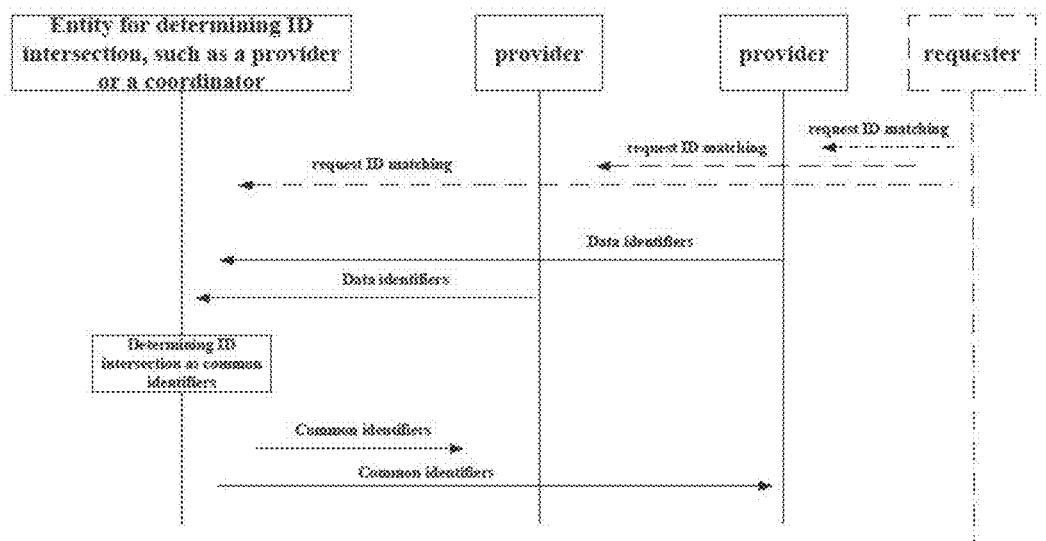
FIGS. 8A and 8B illustrate exemplary ID matching processes according to an embodiment of the present disclosure.

FIG. 8A illustrates an exemplary implementation of ID matching, wherein such ID matching can be requested or trigger by a requester, and performed on the IDs from respective providers, and the ID intersection can be performed in any appropriate entity, which may be the requester, the coordinator, one of the providers, or other entity.

According to an embodiment of the present disclosure, as the entity for performing ID intersection, the processing circuit of the electronic device can be configured to acquire data identifiers from the at least one other provider, match the data identifiers of the electronic device with the data identifiers from the at least one other provider, and notify relevant information of the common identifiers to the at least one other provider. According to another embodiment of the present disclosure, for a provider other than the entity for determining ID intersection, the processing circuit is further configured to transmit data identifiers of the electronic device to an entity for determining ID intersection, and then receive relevant information of the common identifiers as the ID intersection from the entity. Note that the data identifier means identifier indicating data for ID matching, the data may be sample data, predicted data, etc. which is useful for model training and model application.

In an embodiment, the ID matching can be performed among the service providers and dominated by one of the service providers, such as data parties, and the one party can be selected arbitrary, or in consideration of some factors, such as its processing capability, and an party with higher processing capability can be used for determine ID intersection. In another embodiment, the ID intersection may be determined by other entity, such as coordinator, requester, or any other device, which can obtain the IDs from the providers and then present the ID matching result, that is, common IDs, to the providers. Note that such communication throughout the ID matching only transfers user ID, without relating to the production/business data associated with the user ID.

In an embodiment, the ID matching can preferably be implemented in an encryption manner, and particularly the encryption may mean encryption of the user ID as described above. Such data encryption can improve the data communication security and privacy. The data encryption can be implemented in a variety of manners, such as key encryption using public key, encoding/encryption using specific function, such as Hashing function, and any other manner well known in the art.

According to an embodiment of the present disclosure, as the entity for performing ID intersection, the processing circuit of the electronic device can be configured to acquire encrypted data containing data identifiers from the at least one other provider; decrypt the encrypted data to obtain data identifiers from the at least one other provider; and match the data identifiers of the electronic device with the data identifiers from the at least one other provider to determine common identifiers.

According to an embodiment of the present disclosure, as the entity for performing ID intersection, the processing circuit of the electronic device can be configured to perform ID matching by encrypting and transmitting data user identifiers of the electronic device to the at least one other provider; receiving encrypted respective data user identifiers from the at least one other provider and encrypted data user identifiers of the electronic device; decrypting the encrypted respective data user identifiers from the at least one other provider and the encrypted data user identifiers of the electronic device respectively, and matching the decrypted data to determine common identifiers.

Figure 8B:
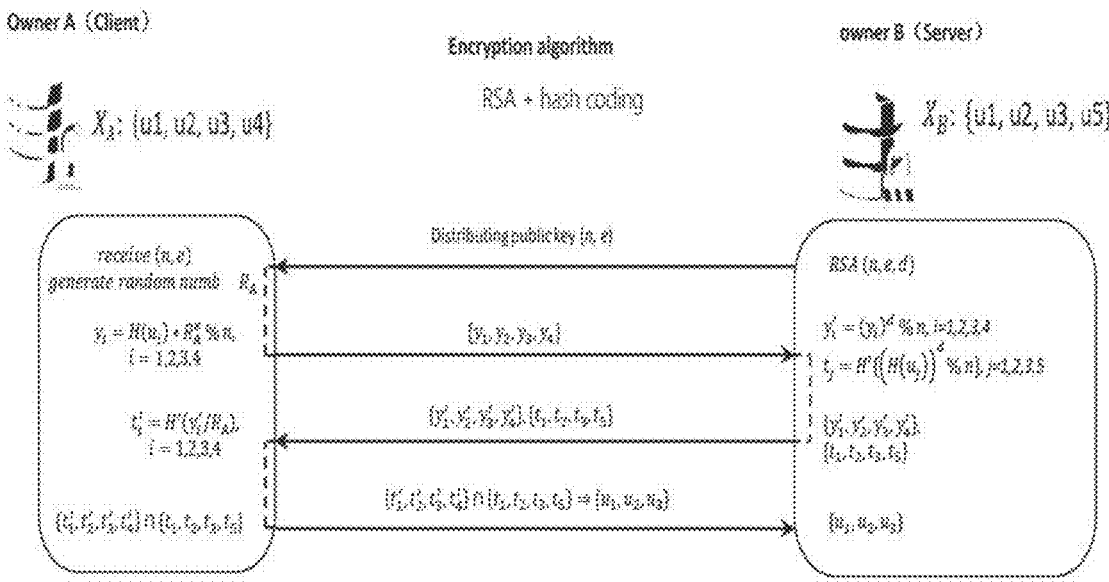

Hereinafter, an exemplary data encryption ID matching according to an embodiment of the present disclosure will be described with reference to FIG. 8B, wherein such ID matching are performed between two data parties A and B in a key encryption manner, and party A determines ID intersection.

First, the party B generates information about encryption keys and algorithms, such as n (public key), e (encryption function/algorithm), and d (decryption function/algorithm) through a RSA algorithm, and then transmits (n, e) as public key to party A. Note that such RSA algorithm is only exemplary, and any other algorithm which can generates appropriate key is also applicable.

Party A transmits all its user IDs to the party B. For example, the party A first passes all its user IDs through a hash function H (its role is to establish a mapping, which is equivalent to encryption), such as $H(u_i)$, or any other appropriate encryption function, and then encrypts them as $Y_A$, such as $\{y_1, y_2, y_3, y_4\}$, and transmits to B by means of the encryption algorithm e.

After the party B receives $Y_A$, it first decrypts the encrypted user IDs using the decryption algorithm d. For example, in consideration that there is still random numbers r and the hash function H of the party A, the party B cannot know the user IDs of the data party A. The party B calculates $Z_A$, $Z_B$, and transmits them back to the party A, wherein $Z_A$ means decryption result of the received IDs from the party A, such as $\{y_1', y_2', y_3', y_4'\}$ and $Z_B$ means that adding a hash function to the user IDs contained in the party B, such as $\{t_1, t_2, t_3, t_4\}$.

After receiving $Z_A$ and $Z_B$, the party A first eliminates the random noise in $Z_A$, which was added by the party A during generation of $Y_A$, and then further applies a Hash data processing, such as the function H'( ), to generate $F_A$, such as $\{t_1', t_2', t_3', t_4'\}$. At this time, the form of $F_A$ and $Z_B$ are of the same form. Then the owner, i.e. party, A can acquire the intersection between $F_A$ and $Z_B$, that is, $\{u1, u2, u3\}$.

The party A can transmit the ID intersection to the own B so that the party B also obtains the intersection $\{u1, u2, u3\}$. In an example, the party A can transmit the ID intersection via Hash function and the party B can perform intersection between the received ID intersection, which may be the same form as $Z_B$ and the IDs contained in the party B, indicated by $Z_B$ to obtain the ID intersection, as shown in FIG. 8B.

Note that the party B can determine the ID intersection in any other appropriate manner. In an example, the ID intersection can be directly notified to the party B, without needing intersection operation at the party B. In another example, the party B can determine the ID intersection by means of decrypting $Y_A$ and thereby performing intersection at the party B.

After data matching as described above, each data party can obtain the common identifiers among them, and then can extract its own data corresponding to the common identifiers for joint training of the model in federated learning.

According to an embodiment, based on the determined training data, the local model training can be performed by means of a local model at the electronic device locally, the local model can be a part of the global model to be trained, even the whole of the global model. And the result of the local model training of respective electronic devices can be utilized for global model training at the coordinator, such as by aggregation, combination, merging, or any appropriate manner. Note that the model training can be implemented in a variety of model training algorithms well known in the art, which would not be described in detail herein. In an embodiment, after the global model training, the coordinator can present the result of the global model training, such as model parameters of the global model, to respective providers, so that the model parameters at respective providers are updated based thereon.

Figure 9A:
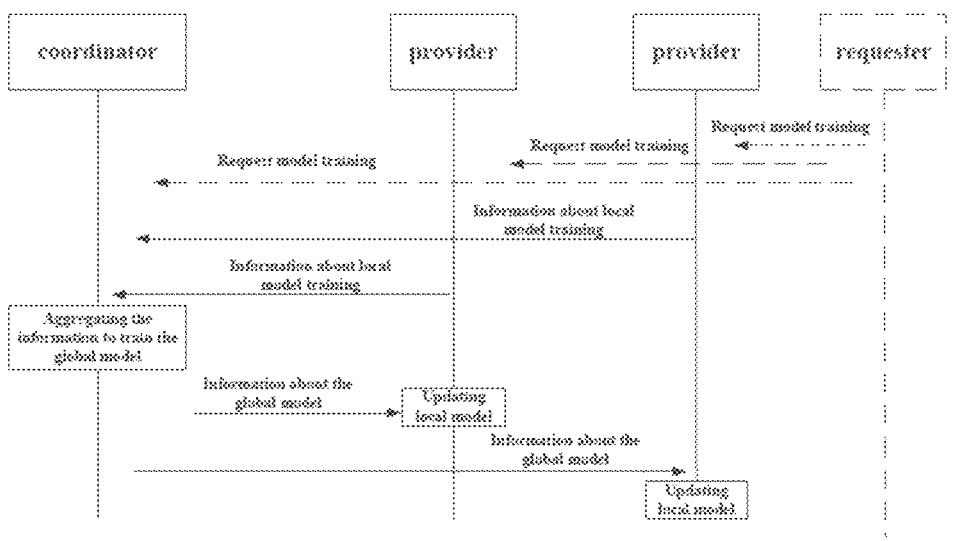
FIGS. 9A and 9B illustrate exemplary secure joint model training according to an embodiment of the present disclosure.

FIG. 9A illustrates model training among the service providers and the coordinator, wherein that the coordinator can be one of the service providers, as discussed above.

According to an embodiment of the present disclosure, as a provider, the processing circuit of the electronic device is further configured to transmit an intermediate information about the local model training at the provider to the coordinator, and receive information about the global model from the coordinator so that the local model can be updated based on the information about the global model. According to an embodiment of the present disclosure, as a coordinator which belongs to a provider, the processing circuit is further configured to acquire the intermediate information about local model training from the at least one other provider, wherein the intermediate result of model training from each other electronic device is obtained by the other electronic device performing local model training based on its own training data, perform global model training based on the intermediate information about local model training of at the provider and the intermediate information about local model training from the at least one other provider, and transmit the information about the global mode to the at least one other provider.

In an example, the result of the local model training of respective electronic device can serve as an intermediate information for model training. According to an embodiment of the present disclosure, the intermediate information includes at least one of model parameters and model performance loss obtained by performing local model training based on the training data of the electronic device. In particular, the intermediate information can be transmitted to the coordinator.

According to an embodiment, the intermediate information may be exchanged between the parties participating in the model training. In particular, the intermediate information may include training parameters from respective parties, and can be exchanged between the parties for facilitating the model training. For example, the data parties can utilize the training parameters to calculate the model gradient (parameters) and model loss, as updated intermediate information.

The model training can preferably be implemented in an encryption manner, and particularly the encryption may mean encryption of the intermediate information for communication between the data party and the coordinator, and/or communication between respective data parties. Such encryption can improve the data communication security and privacy. The data encryption can be implemented in a variety of manners, such as key encryption using public key, encoding/encryption using specific function, such as Hashing function, and any other manner well known in the art.

According to an embodiment of the present disclosure, the processing circuit can be further configured to encrypt the model parameters contained in the intermediate information to be transmitted to the coordinator in the wireless communication system; and receive global model parameters obtained from the coordinator based on the model parameters of each electronic device, so as to update the local model. In an example, the global model parameters also can be encrypted, and in such a case, the processing circuit would decrypt the encrypted global model parameters, and then utilize the decrypted global model parameters to update the local model parameters.

According to an embodiment of the present disclosure, the model training based on the federated learning can be implemented iteratively. In an example, the local model training and cooperative model training can be iteratively performed until the model loss is less than a specific threshold. In an example, during the model training, each electronic device would perform local model training by using local model with the initial parameters, and the results of such local model training would be utilized to create the global model by the coordinator, and local model parameters would be updated based on the global model parameters. Then the coordinator would judge whether the model loss of the created global model is smaller than a threshold. If not, the model training processing will continue to the next round and performs in the manner as above, until the model loss of the global model is smaller than a threshold. Such model loss is well known in the art and the specific threshold can be set appropriately, such as in consideration model accuracy, processing efficiency, etc., which are well known in the art and will not be described in detail. Note that the termination of iterative model training can be based on other criteria, such as number of iterative rounds, etc.

Figure 9B:
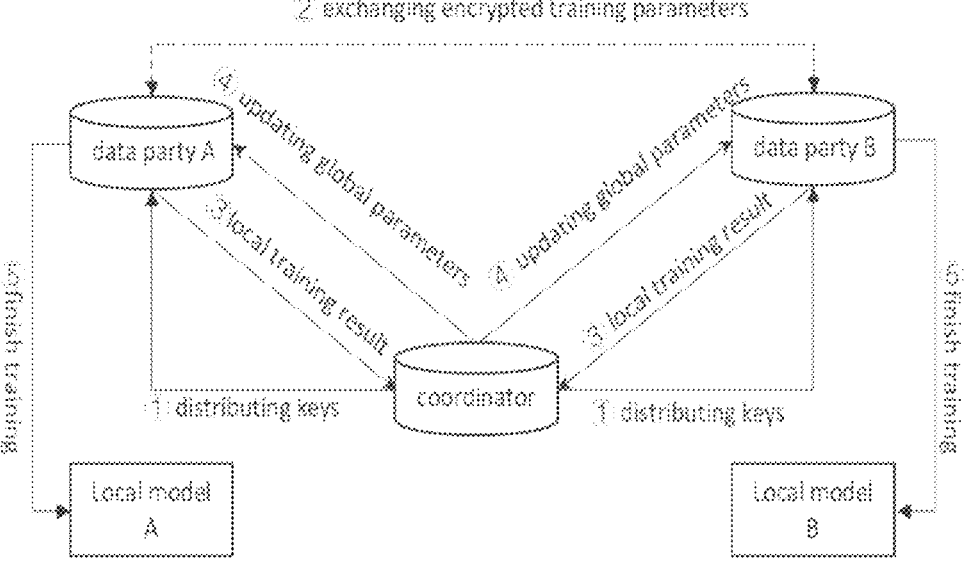

Hereinafter an exemplary model training process will be described with reference to FIG. 9B, which illustrates a schematic view of secure joint training for model according to an embodiment of the present disclosure.

First, the coordinator creates a key pair and sends it to the party A and the party B respectively, as shown in ①.

The parties A and B perform the local training to determine the intermediate result of the customer experience perception model training, and then communicate the intermediate results by means of the key. In particular, the parties A and B can encrypt and exchange intermediate training results with the coordinator, as shown in ③. The intermediate result can be obtained by applying the local or global training model to local data. For example, the intermediate result may include model gradient (parameter), and may further include model loss. Of course, the intermediate result can be any other appropriate information which can be obtained from the local data and can be utilized by the coordinator for establishing the global model, such as determining the parameters of the global model.

In an example, depending on the algorithm requirement, the parties A and B can encrypt and exchange the intermediate result therebetween, as shown in ②, and by means of the exchanged intermediate result, each data party can calculate the model gradient (parameters) and model loss. For example, the parties A and B can perform the local model training to obtain the intermediate result, including training parameter, exchange the intermediate result therebetween, and then utilize the exchanged intermediate result to re-perform the local model training so that the updated intermediate result can be obtained and then transmitted to the coordinator, as indicated by ③. Note that such exchange is not necessary, even can be omitted, and thus is indicated by dash line.

Then, the coordinator can receive the intermediate results from respective parties and perform global model training based on the intermediate results as above, and then present the global model parameters to respective parties, preferably in an encryption manner, as shown in ④.

The parties A and B receive and decrypt the global model parameters, and update the local model parameters. The above process ② to ④ would be repeated until the entire customer experience perception model training is completed, as shown in ⑤.

Note that throughout the joint model training based on the federated learning according to the present disclosure, only the intermediate information, such as information about local model training and global model training, are communicated among the electronic devices, while the data of both parties are kept locally without being exposed to the outside and not shared between the respective product party, each user's privacy data must not be leaked down, which complies with relevant data privacy regulations. Therefore, the entire joint model training based on federated learning is safe and controllable.

Based on the model trained based on federated training, any desired application can be performed by using the trained model. In particular, a joint model application can be implemented based on the trained model in federated learning, by distributing the application across related electronic devices and then combing the result from the related electronic devices to obtain the final global result. For example, such joint model application can comprise customer experience perception evaluation.

Figure 10A:
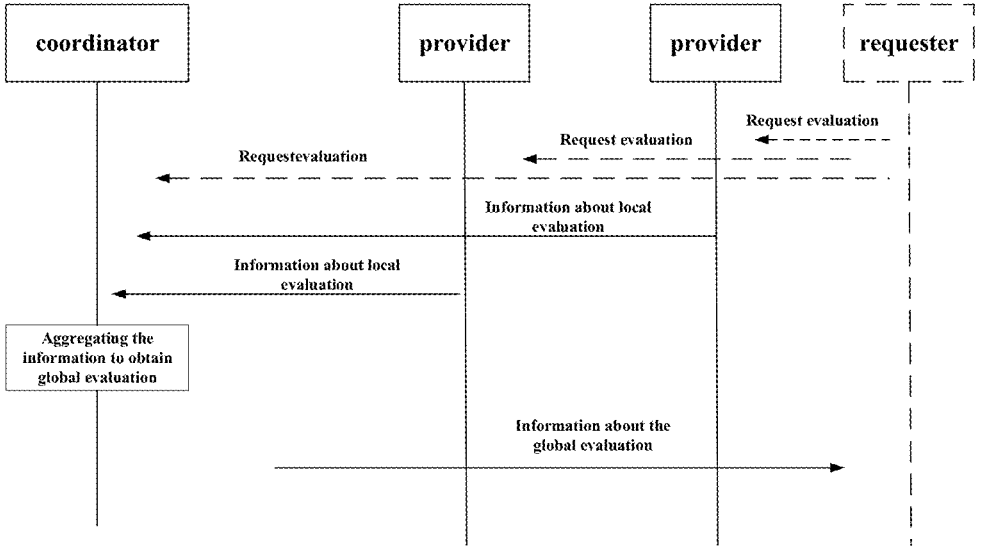
FIG. 10A-10C illustrate exemplary secure joint application of the model according to an embodiment of the present disclosure.

FIG. 10A schematically illustrates secure joint application based on federated learning according to the present disclosure, wherein the secure joint application is performed among the service providers and the coordinator. In particular, when the customer experience perception evaluation is requested, a coordinator can transmit information related to the application, such as ID information, for example, customer/product/service ID or feature name for evaluating customer's experience, to respective providers, and the providers can extract related data corresponding to the ID, perform evaluation based thereon, and transmit the evaluation result to the coordinator, and then the coordinator can merge the evaluation results for obtaining the global evaluation result. Note that in such a case, such information related to the application can also be transmitted to the providers by other entities in the system, such as a requester. So that the transmission from the coordinator to the providers is not necessary.

Note that such information related to the application may indicate an evaluation request with respect to a specific product/business/user, without explicitly indicating ID information, so that the coordinator and related electronic device can perform ID matching, model training and then evaluation based on the trained model with respect to the evaluation, such as described above.

According to an embodiment of the present disclosure, as a provider, the processing circuit of the electronic device is further configured to perform local model evaluation based on local data in response to a model prediction request, and then transmit information about the local model evaluation to a coordinator, wherein the request may include information about the customer experience perception evaluation, and the local data may mean local data corresponding to the information. The information about the local model evaluation may mean the result of the local model evaluation, and can be utilized to realize the global model evaluation/ prediction, wherein the global model prediction result is obtained by combining the local model prediction results from respective providers.

According to an embodiment of the present disclosure, the customer experience perception evaluation can be requested/triggered by any appropriate party in the system as a requester. In an embodiment, a requester can directly transmit the information about the evaluation to request all related service providers to perform the customer experience perception evaluation, or may transmit the information about the evaluation to request a coordinator and then the coordinator can forward the information and communicate with all related service providers to perform the customer experience perception evaluation. Note that the requester may be any appropriate entity in the system such as the coordinator, one of the providers, a controller, or even any other device.

In an embodiment, such evaluation also can be performed in an encryption manner, and particularly the communicated information can be encrypted and decrypted, as discussed above.

Due to the introduction of federated learning technology, the data of respective parties are kept and processed locally, and the security and privacy of the data can be maintained during the whole evaluation process. And the encrypted communication can further improve the data privacy and security. In particular, customer experience evaluation can jointly utilize data at different parties so that the evaluation can be performed based on high-dimension data and the evaluation result is more accurate, more objective and comprehensive.

Hereinafter an exemplary joint application process of the model will be described with reference to FIG. 10B, which illustrates a schematic view of secure joint application for model according to an embodiment of the present disclosure.

Figure 10B:
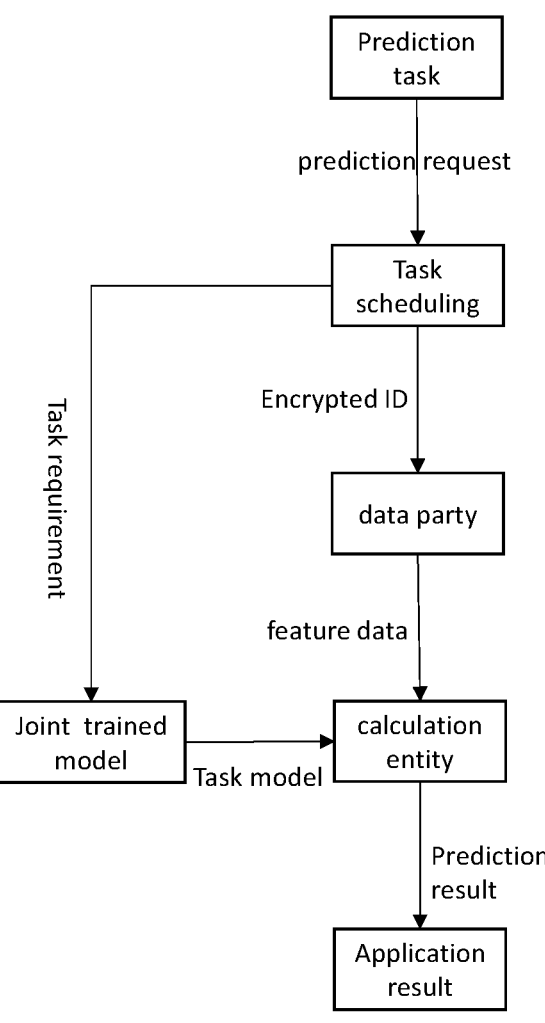

FIG. 10B illustrates a joint application based on the horizontal federated learning. In the horizontal federated learning, all data parties share the global model and parameters, and will process their own data by means of the same global model, and thus user data ID matching/exchange is not involved, the application process of one party does not involve other data parties. A specific process for a data party as follows:

Task scheduling is performed after a request of a prediction task is initiated. And the coordinator transmits information including at least the encrypted data ID to the data party so that appropriate data can be provided for prediction, and a suitable training model can be selected for calculating the prediction result.

Then, the data party encrypts the required feature data information and then transmits it to a computing party. And the calculation party utilizes a joint training model with the received feature data information to calculate the final prediction result, and optionally, encrypt the result. In an example, the calculation party may be separate from the data party, and for example, can be common to a number of data parties, so that the calculation party can obtain all data from the number of data parties and calculate the prediction result. In another example, the calculation party may be associated with the data party, such as integrated with or the same as the data party, for example, for a data party, there exists a corresponding calculating party, which can perform calculation by using the local feature data of the data party and the global model to obtain a local prediction result, and then transmit the local prediction result to an entity to aggregate the final global prediction result.

Then, the encrypted prediction results are transmitted to the result application side, and the prediction results can be used for specific applications after decryption.

Figure 10C:
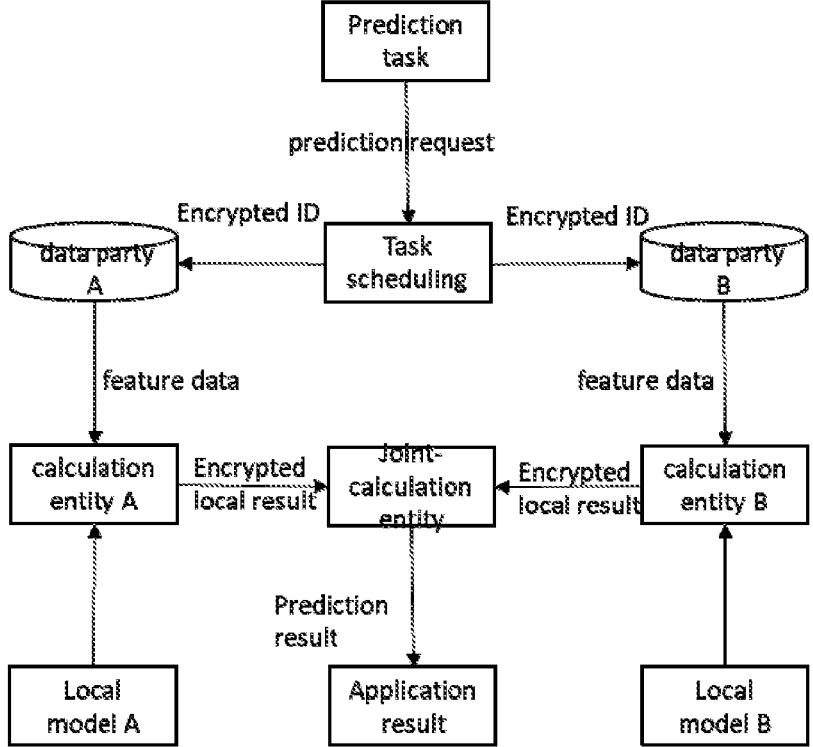

FIG. 10C illustrates a joint application based on the vertical federated learning. In the vertical federated learning, each data party only can utilize its local model and parameters, which may belong to a part of the global model and parameters, and will process its own data by means of the local model. In particular, taking two parties as an example, when using the model to make prediction, data party A and data party B only have part of feature data, and it is necessary to combine the feature data about users owned by both data parties before using the model to make prediction. A specific process is as follows (taking two parties as an example):

Task scheduling is performed after a request of a prediction task is initiated. And the coordinator transmits information including at least the encrypted data ID to the data party A and the data party B, so that appropriate data can be provided for prediction, and a suitable training model can be selected for calculating the prediction result.

The data party A and a data party B can encrypt the required feature data information and then transmit it to the corresponding calculation party A and calculation party B. And the calculation party A combines the local model A with the received characteristic data information provided by the data party A to calculate and obtain an encrypted local calculation result, and the calculation party B also obtains encrypt local calculation results by combining the corresponding model and data.

In particular, for a data party, there exists a corresponding calculation party, which can be dedicated for the data party and only perform the calculation by using the local model. For example, the data party and its corresponding calculation party can be integrated, or the same component.

Then, the calculation A and B send the calculation results of local encrypted data to the joint calculators, and the joint calculators combine the local results and calculate the final encrypted prediction results.

Encrypted prediction results are transmitted to the result application side, and the prediction results can be used for specific applications after decryption.

Note that All parties in the above process are divided into responsible tasks. In practice, one company can be responsible for multiple parties at the same time (for example, Company A can be responsible for initiating requests, scheduling, providing local data A and calculating local results A while Company B is only responsible for providing local data B and calculating local results B), but the information transmitted between all parties is always encrypted, and different task parties cannot obtain the private information of other task parties.

In the federated learning according to the present disclosure, the data utilized in the model training and application in the federated learning can be based on data from different sources, such as different types of data in the network domain and non-network domain, and a high-dimension data can be created for model training and application. On the other hand, the data can be securely utilized for a local processing, without needing gathering data which are common for all providers nor needing gathering all data from respective providers to a specific component for processing. Therefore, the federated learning can efficiently improve processing efficiency, while ensuring data security.

In particular, for the data fusion of B domain (non-network) and 0 domain (network), encrypted ID matching technology is used, which can realize the safe alignment of multi-party data without exposing customer data privacy. Using federated learning technology to conduct cross-domain modeling of B domain (non-network) and 0 domain (network), compared with traditional single domain modeling, it can make the evaluation of customer experience perception more comprehensive, accurate and safe. Compared with migration learning technology, federated learning technology does not require "large-scale" data volume in the evaluation of customer experience perception, which ensures the stability of the application of this method.

In particular, the scheme based on federated learning technology according to the present disclosure belongs to a secure and private joint modeling method proposed specifically for modeling of fragmented data, and particularly can provide a so-called one-stop secure-jointed modeling service, and is especially suitable for customer experience perception scenarios.

The electronic device of service provider can be implemented in a variety of manners. In an example, the electronic device for the service provider according to the present disclosure may include units for performing operations performed by the processing circuit as described above, as shown in FIG. 6, which illustrates a schematic block view of an electronic device for a provider according to an embodiment of the present disclosure.

As shown in FIG. 6, the processing circuit 602 may include determination unit 604 which can determine training data for training a global model related to the customer experience perception based on the federated learning, wherein the training data is related to the customer's experience for a specific service/product/business; training unit 606 which can perform local model training by using the determined training data to obtain intermediate information related to local model training; and transmission unit 608 which can transmit the intermediate information to a coordinator, so that the coordinator can train a customer experience perception model by aggregating the intermediate information from the provider and at least one other provider.

In an embodiment, the processing circuit 602 may further include receiving unit 610 which can acquire information about identifiers of sample data from the at least one other provider, matching unit 612 which can determine identifier intersection between identifiers of sample data of the provider and identifiers of sample data from the at least one other provider as the common identifiers, and the transmission unit 608 can further transmit relevant information about the common identifiers to the at least one other provider.

In an embodiment, the transmission unit 608 can further transmit information about identifiers of sample data of the provider to an entity in the system for determining the common identifiers; and the receiving unit 608 can further receive relevant information about the common identifiers from the entity.

In an embodiment, the receiving unit 610 can further receive information about the trained customer experience perception model from the coordinator, and the processing circuit 602 may further include updating unit 614 which can update the local model at the provider based on the information about the trained customer experience perception model.

In an embodiment, the processing circuit 602 may further include evaluation unit 616 which can perform local customer experience perception evaluation based on customer experience related data, and the transmission unit 606 can further transmit information about the local customer experience perception evaluation to the coordinator, so that the coordinator implements global customer experience perception evaluation by aggregating the information about the local customer experience perception evaluation from the provider and the at least one other provider.

Note that such receiving unit and transmission unit can be combined into a communication unit for the receiving and transmission operation, and also can communicate other information to and from the requester or other entity in the system. Of course, there may exist a separate communication unit for communicating other information to and from the requester or other entity in the system.

It should be noted that although the units are shown in the processing circuit 602, it is only exemplary, and at least one of such units also can be outside of the processing circuit, even out of the service provider. Each of the above units is only a logical module divided according to a specific function implemented by it, instead of being used to limit a specific implementation manner, and for example, such units as well as the processing circuit and even the service provider may be implemented in software, hardware, or a combination of software and hardware. In an actual implementation, the foregoing units may be implemented as independent physical entities, or may be implemented by a single entity (for example, a processor (CPU or DSP, etc.), an integrated circuit, etc.). In addition, the above-mentioned respective units are shown with dashed lines in the drawings to indicate that these units may not actually exist, and the operations/functions they implement may be realized by the processing circuitry itself.

It should be understood that FIG. 6 is merely a schematic structural configuration of the electronic device for the service provider, and optionally, the service provider may further include other possible components not shown, such as a memory, a radio frequency stage, a baseband processing unit, a network interface, a controller, and the like. The processing circuit may be associated with a memory and/or an antenna. For example, the processing circuit may be directly or indirectly (e.g., other components may be connected in between) connected to the memory for data access. Also, for example, the processing circuit may be directly or indirectly connected to the antenna to transmit signals via the communication unit and receive radio signals via the communication unit.

The memory may store various kinds of information, for example, model training and model evaluation related information generated by the processing circuit 602, as well as programs and data for operation by the service provider, data to be transmitted by the service provider, and the like. The memory may also be located inside the service provider but outside of the processing circuit, or even outside of the service provider. The memory may be a volatile memory and/or a non-volatile memory. For example, the memory may include, but is not limited to, random access memory (RAM), dynamic random-access memory (DRAM), static random-access memory (SRAM), read-only memory (ROM), and flash memory.

Figure 11:
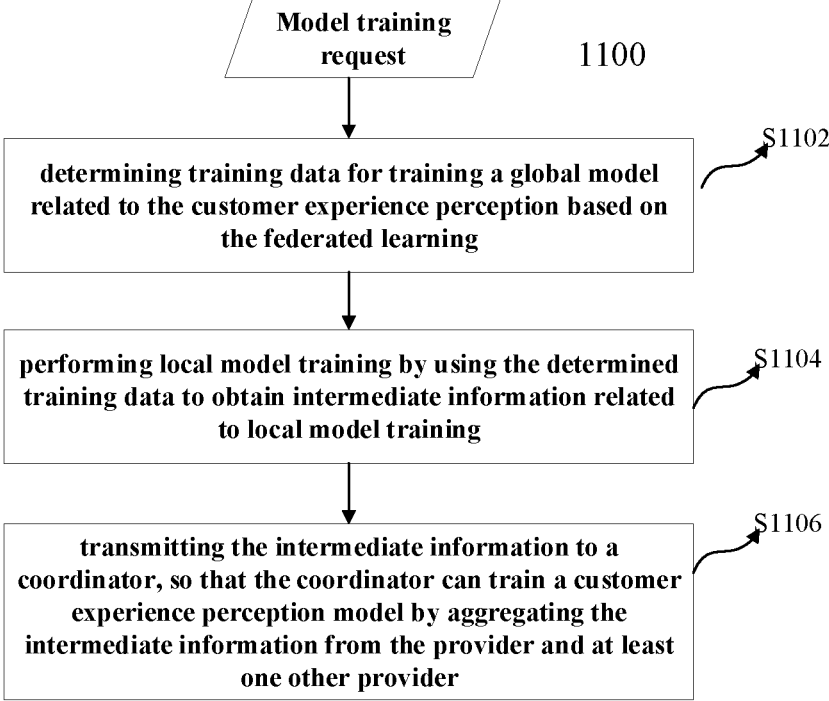
FIG. 11 illustrates a flow chart of a method for the provider according to an embodiment of the present disclosure.

According to an embodiment, there proposes a method for a service provider in a wireless communication system, the service provider capable of implementing customer experience perception with a coordinator and at least one other provider in the wireless communication system through federated learning. FIG. 11 illustrates a flowchart of the method for the provider according to the exemplary embodiment of the present disclosure. The method 1100 includes a step (determining step) S1102 of determining training data for training a global model related to the customer experience perception based on the federated learning, wherein the training data is related to the customer's experience for a specific service/product/business; a step (training step) S1104 of performing local model training by using the determined training data to obtain intermediate information related to local model training; and a step (transmission step) S1106 of transmitting the intermediate information to a coordinator, so that the coordinator can train a customer experience perception model by aggregating the intermediate information from the provider and at least one other provider.

It should be noted that the method according to the present disclosure may further include operation steps corresponding to operations performed by the processing circuit of the above-mentioned electronic device, such as ID matching operation, model evaluation, etc. as described above, which will not be described in detail here. It should be noted that each operation of the method according to the present disclosure may be performed by the aforementioned service provider, in particular by a processing circuit or a corresponding unit, which will not be described in detail here.

According to another embodiment of the present disclosure, there proposed an electronic device for a service coordinator in a wireless communication system, the service coordinator capable of implementing customer experience perception with at least two providers in the wireless communication system through federated learning. The electronic device may comprise a processing circuit configured to: receive intermediate information related to local model training from the at least two service providers which are obtained at the service providers by local model training by utilizing training data for training a global model related to the customer experience perception based on the federated learning, wherein the training data is related to the customer's experience for a specific service/product/business, and trains the global model by aggregating the intermediate information from the at least two service providers.

In an embodiment, the processing circuit may be further configured to transmit information about the trained customer experience perception model to the at least two providers, so that the local model at each of the at least two providers are updated based on the information about the trained customer experience perception model.

In an embodiment, the processing circuit may be further configured to receive information about identifiers of data from the at least two providers, determine identifier intersection between identifiers of data of the at least two providers as the common identifiers, and transmit relevant information about the common identifiers to the at least two providers.

In an embodiment, the processing circuit may be further configured to receive information about the local customer experience perception evaluation from the at least two providers which are obtained at the providers based on customer experience related data, and aggregate the information about the local customer experience perception evaluation from the at least two providers to implement global customer experience perception evaluation.

In an embodiment, the processing circuit may be further configured to transmit a key pair to the at least two providers, so that the at least two providers can perform information communication with the coordinator in an encryption manner based on the key pair.

In an embodiment, the processing circuit can be further configured to determine service provider and the at least one other service provider based on information about data overlapping status thereamong.

In an embodiment, the processing circuit can be further configured to determine the type of federated learning or federated learning algorithm for training the service provider and the at least one other service provider based on information about data overlapping status thereamong.

Figure 12:
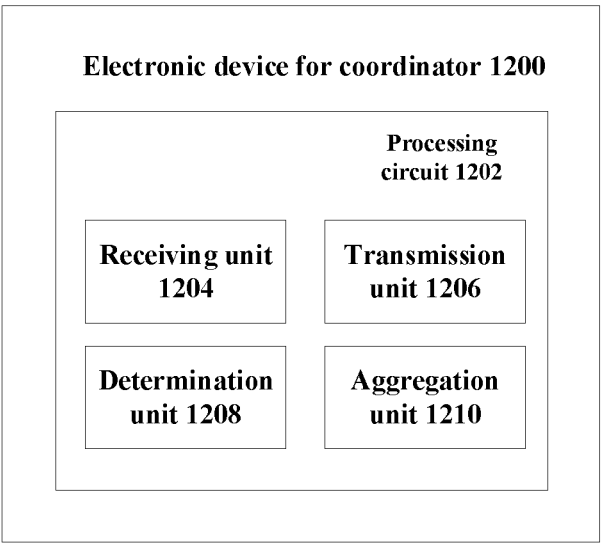
FIG. 12 illustrates a schematic block view of a coordinator according to an embodiment of the present disclosure.

The electronic device of service coordinator can be implemented in a variety of manners, similar with that of the service provider. In an example, the electronic device for the service coordinator according to the present disclosure may include units for performing operations performed by the processing circuit as described above, as shown in FIG. 12, which illustrates a schematic block view of an electronic device for a coordinator according to an embodiment of the present disclosure. The electronic device 1200 may include a processing circuit 1202, and the processing circuit 1202 may include receiving unit 1204, transmission unit 1206, determination unit 1208 and aggregation unit 1210, such units can be configured to perform operations performed by the processing circuit as described above.

Figure 13:
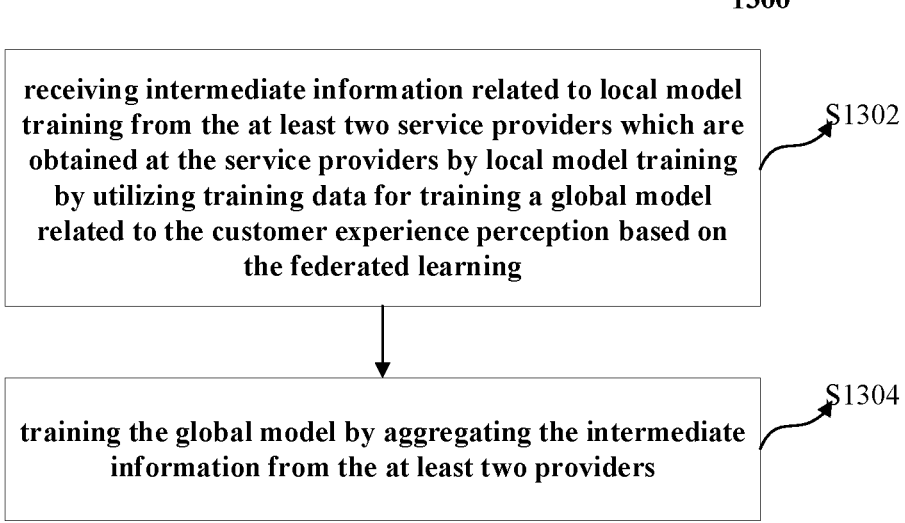
FIG. 13 illustrates a flow chart of a coordination method according to an embodiment of the present disclosure.

According to an embodiment, there proposes a method for a service coordinator in a wireless communication system, the service coordinator capable of implementing customer experience perception with at least two providers in the wireless communication system through federated learning. FIG. 13 illustrates a flowchart of the method for the provider according to the exemplary embodiment of the present disclosure. The method 1300 includes a step (receiving step) S1302 of receiving intermediate information related to local model training from the at least two service providers which are obtained at the service providers by local model training by utilizing training data for training a global model related to the customer experience perception based on the federated learning, wherein the training data is related to the customer's experience for a specific service/product/business, and a step (aggregating step) S1304 of training the global model by aggregating the intermediate information from the at least two service providers.

It should be noted that the method according to the present disclosure may further include operation steps corresponding to operations performed by the processing circuit of the above-mentioned electronic device, such as ID matching operation, model training, model evaluation, etc. as described above, which will not be described in detail here. It should be noted that each operation of the method according to the present disclosure may be performed by the aforementioned service provider, in particular by a processing circuit or a corresponding unit, which will not be described in detail here.

It should be noted that the above description is only exemplary. The embodiments of the present disclosure can also be executed in any other appropriate manner, and the advantageous effects obtained by the embodiments of the present disclosure can still be achieved. Moreover, the embodiments of the present disclosure can also be applied to other similar application examples, and the advantageous effects obtained by the embodiments of the present disclosure can still be achieved. It should be understood that machine-executable instructions in the machine-readable storage medium or program product according to the embodiments of the present disclosure may be configured to perform operations corresponding to the above-mentioned device and method embodiments. When referring to the above embodiments of the device and method, the embodiments of the machine-readable storage medium or the program product are clear to those skilled in the art, and therefore will not be described repeatedly. Machine-readable storage media and program products for carrying or including the aforementioned machine-executable instructions also fall within the scope of the present disclosure. Such a storage medium may include, but is not limited to, a floppy disk, an optical disk, a magneto-optical disk, a memory card, a memory stick, and the like.

Figure 14:
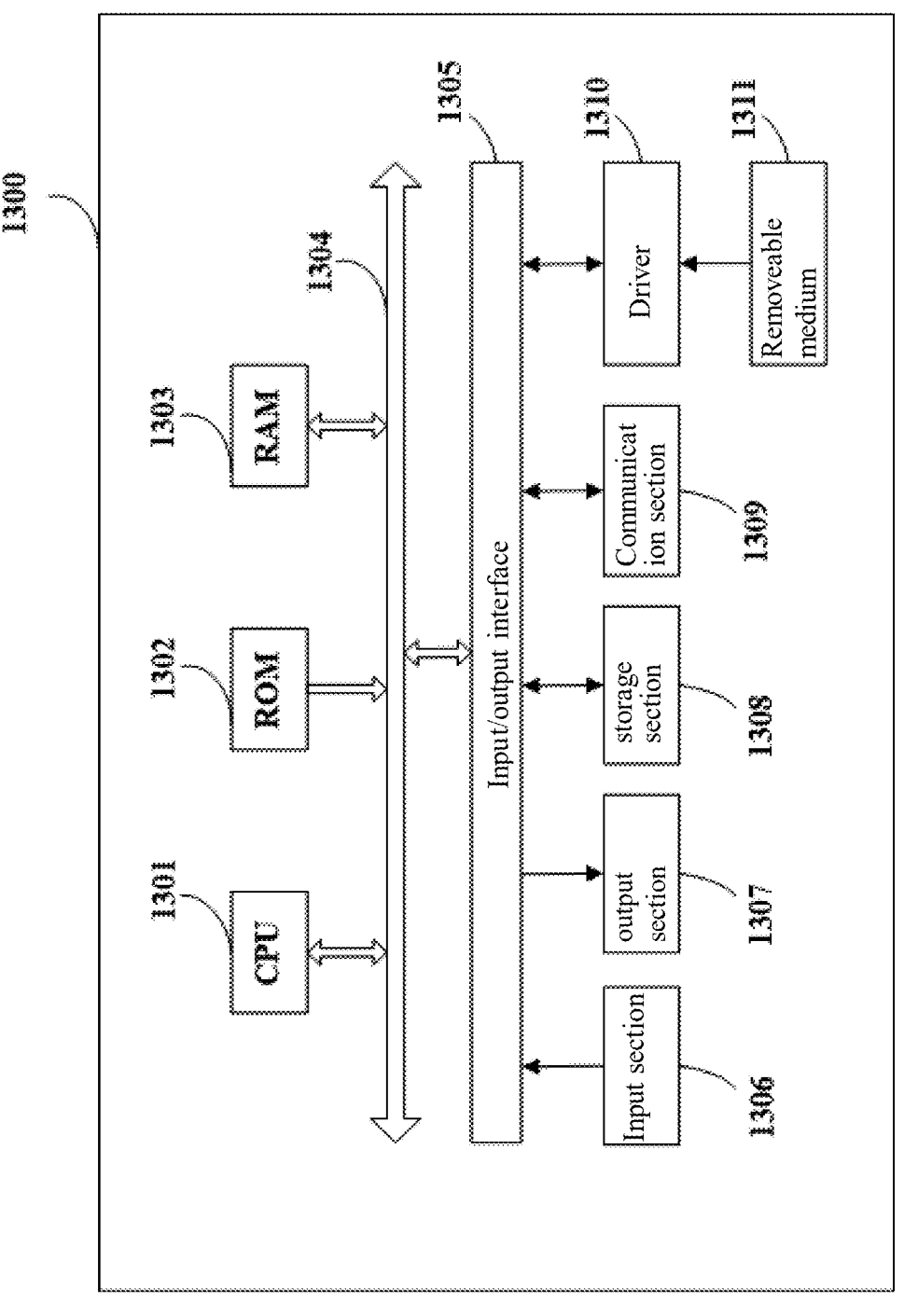
FIG. 14 illustrates an outline of a computer system in which embodiments according to the present disclosure may be implemented.

In addition, it should be understood that the series of processes and devices as described above may also be implemented by software and/or firmware. In the case of being implemented by software and/or firmware, a corresponding program constituting the corresponding software is stored in a storage medium of the related device, and when the program is executed, various functions can be achieved. As an example, a program constituting the software can be installed from a storage medium or a network to a computer having a dedicated hardware structure, such as a general-purpose computer 1300 shown in FIG. 14, and the computer is capable of executing various functions and so on when various programs are installed. FIG. 14 is a block diagram showing an exemplary structure of a computer as an example of an information processing apparatus that can be employed in an embodiment according to the present disclosure. In one example, the computer may correspond to the above-described exemplary electronic device on the service provider side or the electronic device on the application side according to the present disclosure.

In FIG. 14, a central processing unit (CPU) 1301 performs various processes according to a program stored in a read only memory (ROM) 1302 or a program loaded from a storage section 1308 to a random-access memory (RAM) 1303. In the RAM 1303, data required when the CPU 1301 executes various processes and the like is also stored as necessary.

The CPU 1301, the ROM 1302, and the RAM 1303 are connected to each other via a bus 1304. An input/output interface 1305 is also connected to the bus 1304.

The following components are connected to the input/output interface 1305: the input section 1306 including a keyboard, a mouse, etc.; the output section 1307 including a display, such as a cathode ray tube (CRT), a liquid crystal display (LCD), etc. and a speaker, etc.; the storage section 1308 including hard disks, etc.; and communication section 1309 including network interface cards such as LAN cards, modems, etc. The communication section 1309 performs communication processing via a network such as the Internet.

The driver 1310 can also be connected to the input/output interface 1305 as needed. The removable medium 1311 such as a magnetic disk, an optical disk, a magneto-optical disk, a semiconductor memory, etc. is installed on the driver 1310 as needed, so that a computer program read out therefrom is installed into the storage section 1308 as needed.

In the case where the above-mentioned series of processing is realized by software, a program constituting the software is installed from a network such as the Internet or a storage medium such as a removable medium 1311.

Those skilled in the art should understand that a storage medium is not limited to the removable medium 1311 shown in FIG. 14 in which the program is stored and which is distributed separately from the device to provide the program to the user. Examples of removable media 1311 include magnetic disks (including floppy disks), optical disks (including CD-ROMs and digital versatile disks (DVDs)), magneto-optical disks (including mini disks (MD)™) and semiconductor memory. Alternatively, the storage medium may be ROM 1302, a hard disk included in the storage portion 1308, and the like, in which programs are stored, and are distributed to users along with the device containing them.

In addition, it should be understood that multiple functions included in one unit in the above embodiments may be implemented by separate devices. Alternatively, multiple functions implemented by multiple units in the above embodiments may be implemented by separate devices, respectively. In addition, one of the above functions can be implemented by multiple units. Needless to say, such configuration is included in the technical scope of the present disclosure.

Herein, the steps illustrated in the flowchart include not only processes performed in the described order in time series, but also processes performed in parallel or individually instead of having to be performed in time series. Further, even in the steps processed in time series, needless to say, the order can be appropriately changed.

Although the present disclosure and its advantages have been described in detail, it should be understood that various changes, substitutions and alterations can be made hereto without departing from the spirit and scope of the present disclosure as defined by the appended claims. Moreover, the terms "including", "comprising", or any other variation thereof, of the embodiments of the present disclosure are intended to cover non-exclusive inclusion, so that a process, method, article, or device that includes a series of elements includes not only those elements, but includes other elements not explicitly listed, or also elements inherent to such a process, method, article, or device. Without more restrictions, the elements defined by the sentence "including a . . . " do not exclude a case that in the process, method, article, or device that includes the elements, other identical elements exist.

Although some specific embodiments of the present disclosure have been described in detail, those skilled in the art should understand that the above embodiments are merely illustrative and do not limit the scope of the present disclosure. Those skilled in the art should understand that the above embodiments may be combined, modified, or replaced without departing from the scope and essence of the present disclosure. The scope of the present disclosure is defined by the appended claims.

What claimed is that:

1. An electronic device for a service provider in a wireless communication system, the service provider capable of implementing customer experience perception with at least one other service provider in the wireless communication system through federated learning, wherein the customer experience relates to communication performance of a telecommunication service product when used, the electronic device comprises a processing circuit configured to:

acquire information comprising identifiers of samples of local data, that have been encrypted by using a specific encryption algorithm, from the at least one other service provider, wherein the specific encryption algorithm comprises a Hash value encryption algorithm;

encrypt identifiers of samples of local data of the service provider by using the specific encryption algorithm, so that the encrypted identifiers of samples of local data of the service provider and the encrypted identifiers of samples of local data from the at least one other service provider have same forms; determine identifier intersection between the encrypted identifiers of samples of local data of the service provider and the encrypted identifiers of samples of local data from the at least one other service provider as common identifiers, via identifier matching;

determine the local data of the service provider corresponding to the common identifiers as training data for training a global model related to the customer experience perception based on the federated learning, wherein the training data comprises data related to the 'communication performance of the telecommunication service product when used by the customer;

perform local model training by using the determined training data to obtain intermediate information related to local model training, wherein the intermediate information includes information about a result of local model training based on the local data at the service provider corresponding to the common identifiers, and wherein the result of local model training comprises at least one of model parameters and model performance loss;

transmit the intermediate information to a coordinator, so that the coordinator can train the global model by aggregating the intermediate information from the provider and at least one other provider; and update the local model at the service provider based on information about the trained global model from the coordinator, wherein the update of the local model at the service provider comprises adjusting parameters of the local model, wherein the local model training at the service provider and the global model training at the coordinator are iteratively implemented, until a specific termination condition is satisfied, wherein the specific termination condition comprises one of:

whether an iteration number reaches a specific number; or whether a model performance loss is smaller than a threshold, wherein the service provider and the at least one other service provider are selected based on information about data overlapping status thereamong, wherein information about data overlapping status may include at least one of data ID overlapping ratio and data feature overlapping ratio, and wherein two service providers in the system, when at least one of data ID overlapping ratio and data feature overlapping ratio is larger than a corresponding threshold, are suitable for participating in the customer experience perception based on the federated learning.

2. The electronic device of claim 1, wherein the type of federated learning or federated learning algorithm is determined based on the information about data overlapping status among the service provider and the at least one other service provider.

3. The electronic device of claim 1, wherein information about data overlapping status may include at least one of data ID overlapping ratio and data feature overlapping ratio, and wherein when the data ID overlapping ratio is larger while data feature overlapping ratio is smaller, a vertical federated learning is utilized, and when the data ID overlapping ratio is smaller while data feature overlapping ratio is larger, a horizontal federated learning is utilized.

4. The electronic device of claim 1, wherein the processing circuit is further configured to:

transmit relevant information about the determined common identifiers to the at least one other service provider for determining the training data at the at least one other service provider.

5. The electronic device of claim 1, wherein the processing circuit is further configured to:

transmit information about identifiers of samples of local data of the service provider to an entity in the system for determining the common identifiers; and receive relevant information about the common identifiers from the entity.

6. The electronic device of claim 1, wherein the processing circuit is further configured to:

perform local customer experience perception evaluation based on customer experience related data, and transmit information about the local customer experience perception evaluation to the coordinator, so that the coordinator implements global customer experience perception evaluation by aggregating the information about the local customer experience perception evaluation from the service provider and the at least one other service provider.

7. The electronic device of claim 1, wherein the local model at the service provider is a part of the global model to be trained or the global model.

8. The electronic device of claim 1, wherein at least one of the information about identifiers, the relevant information about the common identifiers, the intermediate information related to local model training, and the information about the local customer experience perception evaluation are encrypted.

9. A method for a service provider in a wireless communication system, the service provider capable of implementing customer experience perception with at least one other service provider in the wireless communication system through federated learning, wherein the customer experience relates to communication performance of a telecommunication service product when used, the method comprises:

acquiring information comprising identifiers of samples of local data, that have been encrypted by using a specific encryption algorithm, from the at least one other service provider, wherein the specific encryption algorithm comprises a Hash value encryption algorithm;

encrypting identifiers of samples of local data of the service provider by using the specific encryption algorithm, so that the encrypted identifiers of samples of local data of the service provider and the encrypted identifiers of samples of local data from the at least one other service provider have same forms; determining identifier intersection between the encrypted identifiers of samples of local data of the service provider and the encrypted identifiers of samples of local data from the at least one other service provider as common identifiers, via identifier matching;

determining the local data of the service provider corresponding to the common identifiers as training data for training a global model related to the customer experience perception based on the federated learning, wherein the training data comprises data related to the 'communication performance of the telecommunication service product when used by the customer;

performing local model training by using the determined training data to obtain intermediate information related to local model training, wherein the intermediate information includes information about a result of local model training based on the local data at the service provider corresponding to the common identifiers, and wherein the result of local model training comprises at least one of model parameters and model performance loss;

transmitting the intermediate information to a coordinator, so that the coordinator can train the global model by aggregating the intermediate information from the provider and at least one other provider; and updating the local model at the service provider based on information about the trained global model from the coordinator, wherein the updating the local model at the service provider comprises adjusting parameters of the local model, wherein the local model training at the service provider and the global model training at the coordinator are iteratively implemented, until a specific termination condition is satisfied, wherein the specific termination condition comprises one of:

whether an iteration number reaches a specific number; or whether a model performance loss is smaller than a threshold, wherein the service provider and the at least one other service provider are selected based on information about data overlapping status thereamong, wherein information about data overlapping status may include at least one of data ID overlapping ratio and data feature overlapping ratio, and wherein two service providers in the system, when at least one of data ID overlapping ratio and data feature overlapping ratio is larger than a corresponding threshold, are suitable for participating in the customer experience perception based on the federated learning.

10. The method of claim 9, wherein the method further comprises:

transmitting relevant information about the common identifiers to the at least one other service provider for determining the training data at the at least one other service provider.

11. The method of claim 9, wherein the method further comprises:

transmitting information about identifiers of samples of local data of the service provider to an entity in the system for determining the common identifiers; and receiving relevant information about the common identifiers from the entity.

12. The method of claim 9, wherein the method further comprises:

performing local customer experience perception evaluation based on customer experience related data, and transmitting information about the local customer experience perception evaluation to the coordinator, so that the coordinator implements global customer experience perception evaluation by aggregating the information about the local customer experience perception evaluation from the service provider and the at least one other service provider.

13. A device comprising:

one or more processors; and one or more storage media storing instructions that, when executed by the one or more processors, cause the method according to claim 9 to be performed.

14. A device comprising:

one or more processors; and one or more storage media storing instructions that, when executed by the one or more processors, cause the method according to claim 10 to be performed.

15. A device comprising:

one or more processors; and one or more storage media storing instructions that, when executed by the one or more processors, cause the method according to claim 11 to be performed.

16. A device comprising:

one or more processors; and one or more storage media storing instructions that, when executed by the one or more processors, cause the method according to claim 12 to be performed.

*     *     *     *     *